US010445215B2

(12) United States Patent
Bull et al.

(10) Patent No.: US 10,445,215 B2
(45) Date of Patent: Oct. 15, 2019

(54) DEBUGGING SYSTEM FOR MULTI-THREADED COMPUTER PROGRAMS

(71) Applicant: Undo Ltd., Cambridge (GB)

(72) Inventors: Nicholas Peter Bull, Cambridge (GB); Julian Philip Smith, Cambridge (GB); Gregory Edward Warwick Law, Cambridge (GB)

(73) Assignee: Undo Ltd., Cambridge (GB)

( * ) Notice: Subject to any disclaimer, the term of this patent is extended or adjusted under 35 U.S.C. 154(b) by 147 days.

(21) Appl. No.: 15/662,178

(22) Filed: Jul. 27, 2017

(65) Prior Publication Data

US 2018/0032423 A1 Feb. 1, 2018

(30) Foreign Application Priority Data

Jul. 27, 2016 (GB) .................................. 1613000.7

(51) Int. Cl.
*G06F 9/44* (2018.01)
*G06F 11/36* (2006.01)

(52) U.S. Cl.
CPC ...... *G06F 11/3636* (2013.01); *G06F 11/3664* (2013.01)

(58) Field of Classification Search
None
See application file for complete search history.

(56) References Cited

U.S. PATENT DOCUMENTS 5,870,607 A  2/1999  Netzer
6,324,683 B1 *  11/2001  Fuh ........................ G06F 11/362
714/E11.21

(Continued)

FOREIGN PATENT DOCUMENTS

EP  2600252  6/2013
EP  3093768  11/2016

(Continued)

OTHER PUBLICATIONS

Kiefer et al., Replay debugging of non-deterministic executions in the Kernel-based Virtual Machine, Published online May 27, 2011 in Wiley Online Library (Year: 2011).*

(Continued)

*Primary Examiner* — Insun Kang
(74) *Attorney, Agent, or Firm* — Michael Best & Friedrich LLP

(57) ABSTRACT

A method of generating program analysis data for analyzing the operation of a computer program. The method comprises, executing an instrumented process of the computer program to define a reference execution of the program, intercepting a call to a library function by the instrumented process, executing the library function in an uninstrumented process, for the uninstrumented process, capturing in a log, only data generated by or modified through the execution of the library function required by the instrumented process to continue execution of the program, and wherein the captured log is arranged to enable deterministically reproducing the effect of the library function call on the instrumented process upon re-running of the reference execution based upon the captured log to generate the program analysis data.

11 Claims, 14 Drawing Sheets

(56) References Cited

U.S. PATENT DOCUMENTS

| | | | | |
|---|---|---|---|---|
| 7,673,181 B1* | 3/2010 | Lindo | | G06F 11/3612 714/38.13 |
| 7,958,497 B1* | 6/2011 | Lindo | | G06F 11/3636 714/799 |
| 8,370,841 B2* | 2/2013 | Subhraveti | | G06F 11/203 710/244 |
| 8,578,340 B1* | 11/2013 | Daudel | | G06F 9/45504 710/266 |
| 10,120,762 B1* | 11/2018 | Havemose | | G06F 11/2041 |
| 2006/0167951 A1* | 7/2006 | Vertes | | G06F 11/1482 |
| 2007/0083645 A1* | 4/2007 | Roeck | | G06F 11/2028 709/224 |
| 2007/0198676 A1* | 8/2007 | Vertes | | G06F 11/3476 709/223 |
| 2007/0226740 A1* | 9/2007 | Li | | G06F 11/3632 718/102 |
| 2008/0133214 A1 | 6/2008 | Leventhal et al. | | |
| 2008/0270770 A1* | 10/2008 | Vertes | | G06F 11/3414 712/227 |
| 2008/0270988 A1* | 10/2008 | Li | | G06F 11/362 717/125 |
| 2008/0301417 A1* | 12/2008 | Law | | G06F 9/3863 712/227 |
| 2009/0144742 A1* | 6/2009 | Subhraveti | | G06F 11/203 718/104 |
| 2009/0328079 A1* | 12/2009 | Guo | | G06F 9/545 719/328 |
| 2010/0191884 A1* | 7/2010 | Holenstein | | G06F 11/2094 710/200 |
| 2010/0251031 A1* | 9/2010 | Nieh | | G06F 11/3419 714/45 |
| 2011/0029821 A1* | 2/2011 | Chow | | G06F 11/3476 714/45 |
| 2011/0078666 A1* | 3/2011 | Altekar | | G06F 11/3636 717/131 |
| 2012/0096441 A1* | 4/2012 | Law | | G06F 11/3644 717/127 |
| 2012/0102470 A1* | 4/2012 | Yang | | G06F 11/3632 717/130 |
| 2012/0151464 A1* | 6/2012 | Koren | | G06F 9/44521 717/166 |
| 2012/0284717 A1* | 11/2012 | Arndt | | G06F 11/3636 718/1 |
| 2012/0317551 A1* | 12/2012 | Hecht | | G06F 11/3636 717/128 |
| 2013/0091387 A1* | 4/2013 | Bohnet | | G06F 11/3636 714/38.1 |
| 2013/0132780 A1* | 5/2013 | Bohnet | | G06F 11/3636 714/45 |
| 2014/0173569 A1* | 6/2014 | Krauss | | G06F 11/3664 717/125 |
| 2015/0220422 A1* | 8/2015 | Subhraveti | | G06F 11/3636 714/45 |
| 2016/0335172 A1 | 11/2016 | Smith et al. | | |

FOREIGN PATENT DOCUMENTS

| | | |
|---|---|---|
| GB | 2395313 | 5/2004 |
| WO | 2007045920 | 4/2007 |

OTHER PUBLICATIONS

United Kingdom Intellectual Property Office Search Report for Application No. 1613000.7 dated Jan. 19, 2017 (4 pages).
United Kingdom Intellectual Property Office Search Report for Application No. 1613000.7 dated Feb. 17, 2017 (2 pages).
European Patent Office Search Report for Application No. 17183524.2 dated Mar. 26, 2018, 9 pages.

* cited by examiner

```
.section .data
buf:

.section .text
.globl main
main:

mov  $buf, %ecx  #ecx points at buf
.start:

mov  $3, %eax    #do syscall #3 (read)
  mov  $0, %ebx    #from fd 0 (stdin)
  mov  $1, %edx    #read a single char
  int  $0x80       #make the system call mov  $4, %eax    #do syscall #4 (write)
  mov  $1, %ebx    #to fd 1 (stdout)
                   #ecx still at buff
                   #edx still contains 1
  int  $0x80       #make the system call cmpb $10, buff   #did user hit enter?
  jne  .start      #if not, round again
  ret
```

Figure 2
PRIOR ART

DEBUGGING SYSTEM FOR MULTI-THREADED COMPUTER PROGRAMS

FIELD OF THE INVENTION

This invention relates to methods, apparatus and computer program code to facilitate the debugging of computer programs.

BACKGROUND OF THE INVENTION

In WO2007/045920, hereby incorporated by reference in its entirety, we described techniques which allow a program, more particularly the machine code of a program, to effectively be run backwards. This is helpful as it allows an error to be traced backwards from, say, the moment it caused the program to crash until the error first appeared. As the skilled person will appreciate, crashing can take many forms, generally summarised as the program not running as intended—for example a segmentation fault, and unhandled exception, or an infinite loop.

Whilst backwards execution of a program is invaluable in debugging, it would be useful to have additional tools to make the debugging process easier and faster. There is a particular problem in locating and dealing with bugs which are not readily reproducible—for example a user may occasionally report a program as slow but identifying and correcting the cause of the problem can be difficult if the fault is intermittent.

SUMMARY

Described herein is a method of executing a system call in a multi-threaded computer program for generating program analysis data, the method comprising: running an instrumented version of machine code representing the program wherein the instrumented version of machine code initialises a plurality of threads in a first instrumented process; generating a second instrumented process; executing the machine code of the first thread of the first instrumented process in the second instrumented process; intercepting a system call during the execution of the machine code of the first thread in the second instrumented process; and executing the system call in the first instrumented process.

The second instrumented process may comprise the machine code of the first thread of the first instrumented process. The second instrumented process executes the machine code instead of the first thread of the first instrumented process. By executing the machine code in a separate process, it is possible to record the operations of a multi-threaded program without the need for serialisation of the threads. This allows for more accurate replay of the program and enables race conditions to be reproduced.

Certain instructions however, such as system calls, may not exhibit correct behaviour if executed by a process different to the original thread. Therefore by intercepting a system call before it is executed by the second instrumented process and delegating execution of the system call back to the original thread, correct behaviour of the system call and the program can be ensured.

Generating a second instrumented process may comprise generating a plurality of second instrumented processes, each one of the plurality of second instrumented processes being associated with a respective CPU core. The first thread of the first instrumented process may also be associated with a CPU core and the method may further comprise selecting a second instrumented process of the plurality of second instrumented processes based upon a corresponding CPU core association between the second instrumented process and the first thread of the first instrumented process; and wherein executing the machine code of the first instrumented process in the second instrumented process comprises executing the machine code in the selected second instrumented process.

By selecting a second instrumented process for executing the first thread of the first instrumented process based on a corresponding CPU core association, any CPU optimizations in relation to multi-threaded environments and/or in the machine code of the thread can be taken advantage of to improve the efficiency of the system and the recording method.

The second instrumented process may be associated with a CPU core by binding the second instrumented process to the CPU core. That is, the second instrumented process may be associated with a CPU core by setting the CPU affinity of the second instrumented process. In this way, a second instrumented process is known to operate on a particular CPU core and further optimizations may be achieved based upon this knowledge. The number of second instrumented processes generated may be based upon a CPU core count and there may be one second instrumented process generated per CPU core. In this way, the concurrency provided by a system having a plurality of CPU cores is efficiently used without incurring unnecessary overheads. The number of second instrumented processes generated may be based upon a user specified parameter.

The association between the first thread of the first instrumented process and a CPU core may be based upon the CPU core that the first thread is currently running on or was most recently run on. In this way, the second instrumented process selected to execute the machine code of the thread will correspond to the CPU core chosen by an operating system's thread scheduler to execute the thread. As such, it is ensured that no additional deadlock situations may arise due to executing the machine code of the first thread in the second instrumented process. In addition, any CPU optimisations arising from scheduling and running the thread on a particular CPU core may be maintained when the machine code of the thread is executed by the selected second instrumented process associated with that CPU core.

The method may further comprise executing a second thread of the first instrumented process in the second instrumented process whilst executing the system call in the first instrumented process. The second thread being associated with the CPU core that the second instrumented process is associated with. In this way, the second instrumented process may perform other operations whilst the system call is being executed by the first instrumented process thereby improving efficiency.

Should at any point a selected second instrumented process not be available, for example if the selected second instrumented process is executing the machine code of another thread of the first instrumented process, the first thread may wait until the selected second instrumented process becomes available.

The second instrumented process may be generated based upon the first thread of the plurality of threads in the first instrumented process. In this way, there exists a second instrumented process dedicated to executing the machine code of each thread of the first instrumented process.

The method may further comprise providing data from the first instrumented process to the second instrumented process as a result of execution of the system call in the first instrumented process. Providing the data from the first instrumented process to the second instrumented need not be a direct transfer from the first instrumented process to the second instrumented process and may include writing the data to an area of memory shared between the first instrumented process and the second instrumented process such that the data is accessible by the second instrumented process.

Where there exists a plurality of second instrumented processes, the method may further comprise determining that the association between the first thread of the first instrumented process has changed to a different CPU core and providing data resulting from the execution of the system call in the first instrumented process from the first instrumented process to a second instrumented process of the plurality of second instrumented processes associated with the different CPU core. As such, where execution of a thread is moved to a different CPU core, the second instrumented process selected to execute the machine code of the thread should also switch to the second instrumented process associated with the different CPU core. It may be necessary to provide the data resulting from the system call to the second instrumented process that execution has or will switch to in order to ensure correct execution of the thread's machine code by the second instrumented process associated with the different CPU core.

Alternatively, or in addition, data resulting from the execution of the system call in the first instrumented process may be provided from the first instrumented process to each of the second instrumented processes of the plurality of second instrumented processes.

Providing the data may comprise synchronising at least a portion of data between the first instrumented process and the second instrumented process that is modified as a result of executing the system call in the first instrumented process. The data may include a return value indicating the successful completion or the failure to complete the system call. The data may include the data requested from the operating system through the system call. The data may include a reference to a location of memory where data requested through the system call is held. The data may include data modified in a buffer by the system call. It should be noted that not all of the data resulting from the system call need be synchronised between the first and second instrumented processes if it does not affect the operation of the second instrumented process.

Synchronising at least a portion of data may comprise: copying the portion of data to an area of memory shared between the first instrumented process and the second instrumented process; notifying the second instrumented process that execution of the system call has been completed; and reading, by the second instrumented process, the portion of data in the area of shared memory. In this way, the output data required by the second instrumented process to continue execution of the machine code can be made available to the second instrumented process.

Executing the system call in the first instrumented process may be caused by a remote procedure call. That is, the initial calling process, the second instrumented process, does not then execute the system call. Instead, the first and second instrumented processes are instrumented such that a system call in the second instrumented process results in the execution of the system call by the first instrumented process.

Execution of machine code by the second instrumented process and execution of the system call in the first instrumented process are mutually exclusive. That is, whilst the first instrumented process is executing the system call, the second instrumented process should wait until the completion of the system call before continuing execution of the machine code to preserve the correct ordering of operations in the program.

The mutual exclusivity may be based upon a semaphore. That is a semaphore may be used to control which of the first and second instrumented process is operating at a time.

Intercepting the system call may comprise: marshalling input data and input buffers into the area of memory shared between the first instrumented process and the second instrumented process; and notifying the first instrumented process to execute the system call. In this way, the input data required to execute the system call by the first instrumented process can be made available. The system call may then be executed based upon data read from the area of shared memory.

The method may further comprise: generating a third instrumented process based upon a second thread of the plurality of threads in the first instrumented process; and executing the machine code of the second thread of the plurality of threads in the third instrumented process. That is, a further instrumented process may be generated based upon another one of the plurality of threads in the first instrumented process. The further instrumented process may execute the machine code of the another one of the plurality of threads. Further instrumented processes may be generated for each of the plurality of threads in the first instrumented process. The above method applies equally to each of the further instrumented processes.

It will be appreciated that the above is not limited to any particular type of CPU core and may refer to any form of CPU or processor as would be understood by a person skilled in the art.

Also described herein is a method of generating program analysis data for analysing the operation of a computer program, the method comprising: executing an instrumented process of the computer program to define a reference execution of the program; intercepting a call to a library function by the instrumented process; executing the library function in an uninstrumented process; for the uninstrumented process, capturing in a log, only data generated by or modified through the execution of the library function required by the instrumented process to continue execution of the program; and wherein the captured log is arranged to enable deterministically reproducing the effect of the library function call on the instrumented process upon re-running of the reference execution based upon the captured log to generate the program analysis data.

By executing the library function in a separate uninstrumented process and only capturing the effects of the library function on the instrumented process, the operations executed by the library function need not be recorded, thereby improving the efficiency of running the reference execution. From the point of view of the instrumented process, the effect of the library function may be observed in the data that is returned by the library function or any data of the instrumented process that is modified by library function. This may be data that is required by the instrumented process to continue correct execution of the computer program in the instrumented process and data that is required for deterministically re-running the reference execution.

The method may further comprise, for the instrumented process, capturing in the log, non-deterministic events such that the reference execution can be deterministically re-run based upon the captured log.

The captured data may comprise at least one memory interaction between the instrumented process and the uninstrumented process caused by the execution of the called library function. The at least one memory interaction may be one of or a combination of the following: data is copied from a memory location of the instrumented process to a temporary location of the uninstrumented process and the temporary data is discarded after the data has been processed by the uninstrumented process; and/or data is copied from a memory location of the instrumented process to a temporary location of the uninstrumented process, the temporary data is processed by the uninstrumented process, the processed data is copied back to the instrumented process and the processed data is discarded by the uninstrumented process; and/or data is copied from a memory location of the instrumented process to a memory location of the uninstrumented process and is synchronised upon entry and exit of each call to the library function; and/or data is copied from a memory location of the uninstrumented process to a memory location of the instrumented process and is synchronised upon entry and exit of each library function call until the occurrence of an event is determined.

That is, only the memory interactions between the instrumented process and the uninstrumented process executing the library function that affects continued execution of computer program in the instrumented process and is required for deterministically re-running the reference execution need be recorded in order to improve efficiency.

The method may further comprise receiving an analysis of the at least one memory interaction with respect to a process executing the library function and a process calling the library function; and wherein capturing the at least one memory interaction between the instrumented process and uninstrumented process is based upon the received analysis. The received analysis may be in any suitable format. For example, the received analysis may be in a computer readable format instructing which memory interactions should be captured.

The analysis may have been generated automatically based upon the library's application programming interface or the analysis may have been generated through manual inspection or a combination of the two.

The method may further comprise returning output data of the library function call from the uninstrumented process to the instrumented process.

The method may further comprise creating the uninstrumented process. Alternatively, where an uninstrumented process already exists, the existing uninstrumented process may be used.

The uninstrumented process may be created in response to detecting that a library is associated with the instrumented process. That is, the uninstrumented process may be created upon loading of the library or attaching of the library to the instrumented process or through any other suitable means of detecting an association of the library with the instrumented process.

The uninstrumented process may be a child process of the instrumented process.

Executing the called library function in the uninstrumented process may be caused by a remote procedure call. That is, the initial calling process, the instrumented process, does not then execute the library function call. Instead, the instrumented process is instrumented such that the library function call is executed by the uninstrumented process.

The remote procedure call may be managed by library call intercepting code. The library call intercepting code may be responsible for ensuring the required inputs for executing the library function are accessible by the uninstrumented process. The library call intercepting code may also be responsible for ensuring any data resulting from the execution of the library function by the uninstrumented process is accessible by the instrumented process to continue execution of the computer program.

At least one input parameter to or at least one output parameter of the remote procedure call may be a pointer to a memory location.

The library may be a graphics processing library.

There is also described herein, a method of generating program analysis data for analysing the operation of a computer program, the method comprising: running a first instrumented version of machine code representing the program, wherein said running defines a reference execution of said program; capturing a log of non-deterministic events during said reference execution such that the machine code can be re-run in a deterministic manner to reproduce states of a processor and memory during the re-running; generating a second instrumented version of said machine code comprising instrumented machine code to replay execution of said machine code representing the program and to capture and store program state information during said replayed execution, wherein said program state information comprises one or both of one or more values of registers of said processor and one or more values of memory locations used by said program; running said instrumented machine code whilst reproducing said non-deterministic events during said running to reproduce said reference execution; and capturing said program state information whilst reproducing said reference execution to generate said program analysis data.

In embodiments a first instrumented version of the machine code is generated in order to capture the log of non-deterministic events, and then a second instrumented version of the machine code generates additional/different instrumentation on replay for further analysis. Thus the first instrumented version of the machine code may be a relatively lightweight version of the code, since no data for analysis need be captured at this stage (in principle the two instrumented versions of the code could be the same, but this would be undesirable).

In embodiments the technique allows the execution in which the bug appears to be captured and then replayed, as many times as desired, in an essentially identical manner so far as the actions of the program are concerned. This facilitates offline analysis to identify the source of an error. More particularly by logging and replaying non-deterministic events the replayed execution can be made essentially deterministic, in effect providing another method for the user to go back in time over the program execution. Thus embodiments of the invention avoid the need to instrument the program to capture extensive details of its operation during execution of the program, which is slow and can involve the programmer guessing in advance where the fault might lie. In some preferred embodiments, as well as values of registers and memory locations the instrumented machine code may generate program state information comprises information identifying which registers and/or memory locations were read and/or written, in particular by which instructions and thus by which line(s) of source code.

In some preferred embodiments implementation of the method also includes performing (or providing the ability to perform) a reverse search on the program analysis data. Thus preferred embodiments provide the ability to effectively search backwards in time from a debug point in the program, to identify a defined condition in the program analysis data.

The debug point from which the reverse search is commenced is typically a count of the number of machine code instructions that have been executed to this point, or an approximation thereof. The defined condition is typically a defined event—this may be defined by a condition of a register and/or memory location which may include, for example, a program counter value (which can map to a defined line of source code).

In preferred embodiments the reverse search is performed by running the instrumented machine code forwards one or more times to reproduce the reference execution and, in particular, to identify a most recent time at which the defined condition is met prior to the debug point. For example a particular register value may be modified several times and the reverse search then identifies the most recent time at which, say, the value was modified. In the case of a loop the reverse search may identify the last (most recent before the debug point) occasion on which the loop was performed.

In some preferred implementations the method involves capturing a succession of snapshots of the program state at successive times during running of the reference execution of the program, or during deterministic replay of the reference execution. Since embodiments of the method provide the ability for deterministic replay such snapshots need not be created at the same time as the initial, reference execution is captured. In embodiments of the techniques we describe a snapshot may comprise a complete or substantially complete copy of memory and registers used by the program, or a 'delta' (record of changes) since a previous snapshot.

In embodiments of the method the most recent time at which a condition is met is identified by an instruction count, that is by a count of executed instructions. In a refinement the time is also determined by a count of the number of (non-deterministic) events executed up to that time—thus in embodiments "time" may be defined by a combination of the number of executed instructions and a number of events in the log of non-deterministic events. Counting the number of events can be advantageous as it is possible for two different events to occur at the time of a single instruction, in particular where an interrupt stalls an instruction.

Thus in embodiments the instrumented machine code is instrumented to permit deterministic replay of non-deterministic events, and further instrumented for post hoc execution analysis, for example to perform a reverse search and/or to capture program analysis data as described below.

In embodiments, when the reference execution is replayed in a deterministic manner one advantageous category of data to collect is data relating to 'functions' (of whatever type) defined in the source code. Thus in embodiments data identifying a calling function and/or a called function is collected, for example a memory address of the respective function(s) which may then be mapped to a name or identifier of the relevant function(s) in the source code. Some preferred embodiments of the method build a function-call graph from such data, that is a tree or graph whose nodes represent functions, edges connecting the nodes defining which function called which (since the instrumented code is able to determine the calling function and target function). Optionally such edges may be weighted by the number of calls, for example incrementing the weight by +1 for each call made. The use of a deterministically replayed execution of a reference execution allows more data to be obtained from such an approach than, say, by mere static analysis of the code.

Additionally or alternatively program state information captured by the instrumented replayed execution may include heap memory control information. In some preferred embodiments this control information may comprise a tally of what memory is allocated and freed, in particular by what line(s) of source code. Again, whilst this information may be collected in other ways these generally involve having to guess at a likely problem, then instrument the executable code, then run the executable code to determine whether or not the guess was correct. This approach is slow and, more importantly, fails to capture one-off problems caused by particular, often unusual combinations of circumstances such as a particular user input, network value or the like. By contrast embodiments of the method we describe are able to use the captured reference execution with its associated log of non-deterministic events to guarantee that an error in the captured reference execution is repeatable, and hence analysable to resolve the problem.

One particularly useful function is the ability to ask the question 'where did this [register] value come from?'. This information can be provided by capturing and storing program state information identifying a write to a processor register (using the instrumented machine code), and then using this information to identify a most recent write to the register prior to a debug point in the program (machine code). In preferred embodiments the automatic identifying comprises sub-dividing the machine code into blocks of instructions where in each block if one instruction (a first instruction) executes then (all) subsequent instructions in the block also execute. The instrumented machine code is then used to generate register write data for each executed block of instructions, this data identifying one or more registers written by the blocks of instructions. Then a most recent write to the register may be identified by searching block-wise through the register write data to determine the most recent instruction modifying the register. This procedure may be implemented as part of the reverse search previously described. The skilled person will appreciate that watch-points which trigger an exception when a particular memory address is changed may be implemented by the processor itself.

Although it is helpful to identify when (at which instruction) a processor register is most recently changed, it is particularly desirable to be able to trace back the modification to the register, potentially to the origin of the data. The ultimate source of the data may be, for example, an input to a program, data from a file, data from a user input, data defined by an instruction, and so forth. Although the techniques we have described above in principle enable data flow to be traced back manually, this is preferably automated. In broad terms, this can be achieved by re-running the deterministic reference execution multiple times, tracing back one step each time, an approach which is facilitated by the use of 'snapshots' as described earlier.

In some cases the modification to a register has a single source, but in others there may be multiple different sources, potentially with some shared history. An attempt to track changes in register values running forwards in time would, in effect, construct a tree showing modifications of the all the registers and memory locations, which is impracticable. However embodiments of the techniques we describe, in particular the technique of performing a reverse search, in effect trace back from a leaf node towards the trunk rather than attempting to build the complete tree, and therefore become practicable to implement. It is relatively straightforward to deterministically replay the reference execution to, in effect, step backwards in time asking the question "where did the value modifying the register come from?", and then "where did that value come from?" and so forth. It will be appreciated that where a data structure is constructed with such a chain then this may also be used to identify where, for example, a value is modified in two different ways which are then recombined to modify a further register value.

Thus embodiments of the techniques we describe facilitate determining where register (and other) values come from. This can be extremely difficult using other methods.

One application of such techniques is in analysing the security of a program, in particular by identifying the origin of a data value and whether or not the data is subject to any intermediate modification or checks/validation. This can be used, for example, to identify whether a value such as a memory allocation value or buffer size is subject to security validation—embodiments of the techniques we describe make it relatively straightforward to perform this check. This is useful because a large percentage of viruses make use of some form of buffer overrun including, for example, the Heartbleed security bug in the OpenSSL cryptography library.

We have described techniques for identifying writes to a processor register. In embodiments the method includes a procedure for looking forwards to identify subsequent (next) register and/or memory changes dependent upon an identified read from memory or a processor register.

The skilled person will appreciate that the stored program analysis data may be processed in any convenient manner. For example it may be output in raw or graphical form for user evaluation. Thus in embodiments of the above described method a user interface is provided, for interacting with the program analysis method/system. Optionally an interface may also be provided to facilitate selective capturing of the log of non-deterministic events in response to a detected condition such as an error or bug in the program. For example a circular buffer of the non-deterministic events may be maintained and saved to a file on a non-transient medium when a program/bug/error/fault is detected.

In a related aspect described herein, there is provided a non-transitory carrier medium carrying a data structure for use in a method as described above, the data structure comprising: at least a portion of said machine code representing the program; a log of non-deterministic events for at least a portion of said program having a bug; and at least one of: program starting state data comprising data defining a complete or substantially complete copy of memory and registers used by the program at a starting state of said portion of said machine code representing said program, and reference state data, wherein said reference state data comprises data defining content read from pages of memory accessed during a reference execution of at least said portion of said machine code, wherein said content comprises content read from the page the first time that the page is accessed during said reference execution.

Embodiments of such a data structure provide information for remote post-hoc analysis of the code. In one approach a snapshot (as defined elsewhere herein) is taken to define a starting state for the machine code; this may but need not be an initial start point—that is the program/machine code may be started at some intermediate point. The event log contains the non-deterministic changes and other changes can be computed by re-executing.

In another approach, however, there is no need to take a snapshot at the start of the machine code. Instead the contents of a page of memory are read the first time the (each) page is accessed during the reference execution. Trapping accesses to memory locations is described later with reference to non-determinism but it should be recognised that the technique described here is not related to non-determinism—instead it is effectively a way to record the starting state "just in time". This is thus a deterministic approach defined by the (portion of) machine code in the data structure. Such an approach can, for example, provide reduced memory usage in some situations.

Thus in embodiments of this approach one can begin, for example, with an empty starting state and then during the reference execution "fault in" state when it is first accessed. For example, one approach may begin with all (relevant) memory set up by the MMU (memory management unit) to fault when accessed, and then as the reference execution is run, respond to faults by creating events in the event log of the page that has been accessed, and then changing the page's permissions so that it the page does not fault the next time. Alternatively the machine code may be instrumented to achieve a similar effect.

Optionally the machine code in the data structure may additionally (or alternatively) comprise instrumented machine code instrumented to permit deterministic replay of non-deterministic events and/or post hoc execution analysis. As the skilled person will also appreciate, embodiments of such a data structure may be distributed between a plurality of coupled components in communication with one another.

Thus in a related aspect the invention provides a method of capturing reference state data for deterministic re-execution of a computer program for analysis, wherein said program is represented by machine code, the method comprising: recording data defining content read from portions of memory accessed during a reference execution of said machine code; wherein said content comprises content read from a portion of memory the first time that the page is accessed during a reference execution of said computer program for re-execution; and wherein said recorded data comprises reference state data defining said content is usable for deterministic re-execution of said machine code.

In some preferred embodiments the method further comprises configuring the portion of memory accessed by the machine code, to generate a fault when accessed. In preferred embodiments this portion of memory is a page of memory. The procedure then responds to the fault to capture data read from the portion/page of memory in an event log and changes an access permission for the portion/page such that said fault is not generated when that portion/page of memory is accessed subsequently.

Further provided is processor control code to implement embodiments of the above described method, and corresponding systems. The code is provided on a non-transitory physical data carrier such as a disk or programmed or non-volatile memory. Again the code may be distributed amongst coupled components in a system.

Further provided is a backwards debugger configured to generate program analysis data, the backwards debugger comprising software to: run a first instrumented version of machine code representing the program, wherein said running defines a reference execution of said program; capture a log of non-deterministic events during said reference execution such that the machine code can be re-run in a deterministic manner to reproduce states of a processor and memory during the re-running; generate a second instrumented version of said machine code, said instrumented version of said machine code comprising instrumented machine code to replay execution of said machine code representing the program and to capture and store program state information during said replayed execution, wherein said program state information comprises one or both of one or more values of registers of said processor and one or more values of memory locations used by said program; run said instrumented machine code whilst reproducing said non-deterministic events during said running to reproduce said reference execution; and capture said program state information whilst reproducing said reference execution to generate said program analysis data.

Further provided is a backwards debugger configured to implement a method of returning to a state in the history of execution of a computer program, said state comprising a set of values of one or more of registers of a processor on which the program is running and of working memory space to which the program has access, the method comprising: identifying, in machine code representing said program, instances of machine code instructions associated with substantially non-deterministic events; generating a first instrumented version of said program machine code instructions to handle said substantially non-deterministic events; executing said first instrumented version of said program machine code; storing a time series of said states, including a log of said non-deterministic events, during said executing to define a reference execution; restoring a said stored state; and executing said first instrumented version of said program machine code forward in time starting at said restored state to return to said state in said program history of execution; wherein the backwards debugger is further configured to: input data defining an analysis to be performed on said machine code; generate a second instrumented version of said program machine code to perform said analysis; run said second instrumented version of said program machine code whilst reproducing said non-deterministic events during said running to reproduce said reference execution of said program; and store program analysis data generated by said second instrumented version of said machine code when said second instrumented version of said program machine code is run.

As previously described, in embodiments the first time the machine code representing the program is run it is modified to capture and log non-deterministic events. Thereafter it is instrumented to replay the log in a deterministic manner, in order to facilitate one or multiple instances of deterministic execution replay for analysis.

BRIEF DESCRIPTION OF THE DRAWINGS

The operation of an example backwards debugging system, in the context of which aspects and embodiments of the invention may operate, is described with reference to the accompanying drawings in which:

FIG. 2 shows an example Linux program;

DETAILED DESCRIPTION OF PREFERRED EMBODIMENTS

To provide context for describing the operation of embodiments of the invention we first describe some backwards debugging systems in the content of which some preferred embodiments of the invention operate.

Backwards Debugging Systems

Broadly a backwards debugger allows a program to be executed in such a manner that it appears that the execution is backwards, that is in a reverse direction to the normal direction of program code execution. Thus in a backwards debugger is a debugger that allows a program being debugged to be rewound to an earlier state, and then allows the user to inspect the program's state at that earlier point. Such a debugger ideally provides commands to allow the user to step the program back in small well-defined increments, such as single source line; a machine instruction; step backwards into, out of, or over function calls and the like.

We will describe bidirectional or backwards debugging where (preferably) substantially the complete state of a running computer program can be examined at any point in that program's history. This uses a mechanism to 'unwind' the program's execution. This is a difficult problem, because as a program executes previous states are generally irretrievably lost if action is not taken to record them (for example, writing to a memory location causes whatever information was previously at that memory location to be lost). There are two approaches to solving this problem: firstly to log every state transition as the program executes; secondly, to re-execute the program from an earlier recorded state to reach the desired point in its history. The first suffers from several problems, including slow forwards execution of the program, and the generating of large amounts of data as the program executes. The second approach is generally more efficient but requires that non-determinism be removed on re-execution so that the program follows exactly the same path and transitions through exactly the same states each time it is re-executed.

Figure 1:
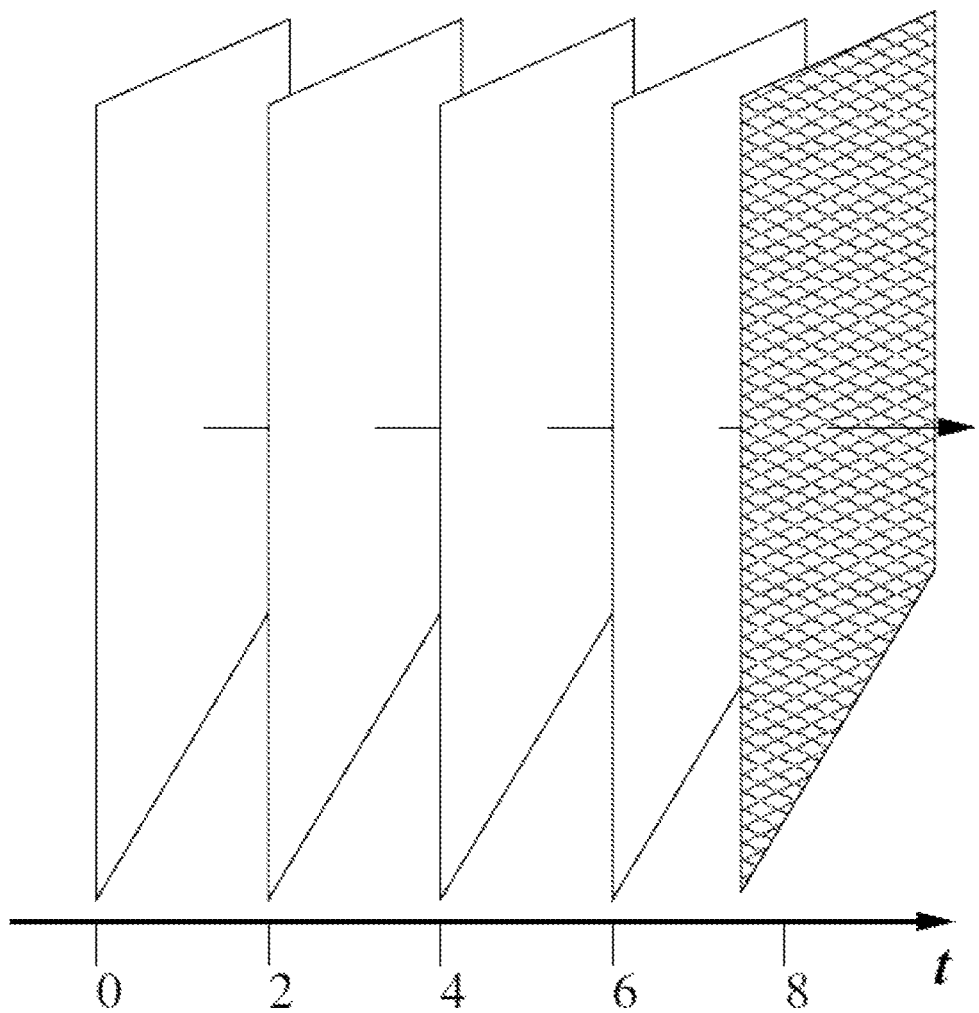
FIG. 1 shows a running program with snapshots at regular 2 second intervals.

We describe a mechanism whereby a 'snapshot' is periodically taken of a program as it runs. To determine the program's state at a given time t in its history, we start with the snapshot taken most recently before time t, and execute the program forwards from that snapshot to time t. For example, FIG. 1 depicts a program under execution. The program has been running for a little over 7 seconds, with snapshots having been taken every 2 seconds. In order to find the state of this program at t=5 s the snapshot taken at 4 s is replayed for 1 s. We use the inherent determinism of a computer to ensure that the when the snapshot of the program is replayed to time t, it will have exactly the same state as had the original program at time t. The UNIX fork system call provides one mechanism to snapshot a process.

Unfortunately, while a computer itself is deterministic, computer programs do not run deterministically, due to non-deterministic inputs. That is, when we say a computer is deterministic we mean that given the same set of inputs, it will always run through the same state changes to the same result. Therefore, if we wish to ensure that a snapshot of a program is replayed exactly as the original, we should ensure that exactly the same inputs are provided to the replayed program as were provided to the original.

Fortunately, most modern, 'protected' operating systems provide a sanitised 'virtual environment' in which programs are run, commonly referred to as a process. An important feature of processes in this context is that they strictly limit the computer resources that are accessible to a program, making it practical to control all sources of non-determinism that may influence a program's execution. These resources include the memory that is accessible by the process, as well as operating system resources, such as files and peripherals. We define all such resources as the process state. The memory and register set of a process make up its internal state, while operating system resources that it may access make up its external state. The controlled environment of a process means that with the help of instrumentation it is practical to eliminate substantially all significant sources of non-determinism during execution of the process.

We have identified four categories of non-determinism for a computer process executing on a protected operating system:

1) Non-deterministic instructions are instructions which may yield different results when executed by a process in a given internal state. The most common form of non-deterministic instruction is the system call (i.e. the instruction used to make a request of the operating system). For example, if a process issues a system call to read a key press from the user, the results will be different depending on which key the user presses. Another example of a non-deterministic instruction is the Intel IA32 rdtsc instruction, which obtains the approximate number of CPU clock ticks since power on.

2) A program executing multiple threads will show non-determinism because the threads' respective transactions on the program's state will occur in an order that is non-deterministic. This is true of threads being time-sliced onto a single processor (because the operating system will time-slice at non-deterministic times), and of threads being run in parallel on multiprocessor systems (because concurrent threads will execute at slightly different rates, due to various external effects including interrupts).

3) Asynchronous events are events issued to the process from the operating system that are not the direct result of an action of that process. Examples include a thread switch on a multithreaded system, or a timer signal on a UNIX system.

4) Shared memory is memory that when a location read by the program being debugged does not necessarily return the value most recently written to that location by the program being debugged. For example, this might be because the memory is accessible by more than one process, or because the memory is written to asynchronously by the operating system or by a peripheral device (often known as DMA—Direct Memory Access). As such out-of-band modifications are performed outside of the context of the program being debugged, this may result in non-determinism during re-execution.

Preferably a bidirectional or backwards debugging system should be able to work in all circumstances, and preferably therefore the aforementioned sources of non-determinism should be eliminated. To achieve this, all non-deterministic events are recorded as the debugged process executes. When replaying from a snapshot in order to obtain the program's state at some earlier time in history, the recorded non-deterministic events are faithfully replayed. The mechanism used to employ this is described in the following section.

We employ a technique of machine code instrumentation in order to record and replay sources of non-determinism. Our instrumentation is lightweight, in that it modifies the instrumented program only slightly, and is suitable for use with variable length instruction sets, such as Intel IA32.

We instrument by intercepting control flow at regular intervals in the code. Sections of code between interception are known as basic blocks. A basic block contains no control flow instructions, and no non-deterministic instructions—that is, a basic block contains no jumps (conditional or otherwise) or function calls, nor system calls or other non-deterministic instructions, or reads from shared memory. Control flow and non-deterministic instructions are therefore termed basic block terminators.

An instrumented program is run such that all the basic blocks are executed in the same order and with the same results as would be the case with its equivalent uninstrumented program. The instrumentation code is called between each basic block as the instrumented program executes. Each of the program's original basic blocks are copied into a new section of memory, and the basic block terminator instruction is translated into one or more instructions that ensure the instrumentation code is called before control continues appropriately.

As an example, consider the Linux program shown in FIG. 2, written in Intel IA32 assembler (using GNU/AT&T syntax):

This simple program reads characters from stdin, and echos them to stdout. The program contains four basic blocks, terminated respectively by the two int $0x80 instructions, the jne and the ret instruction at the end.

For convenience, we term the uninstrumented program P, and its instrumented equivalent P'. For each basic block there is an uninstrumented basic block $B_n$, and a corresponding instrumented basic block $B'_n$.

Figure 3:
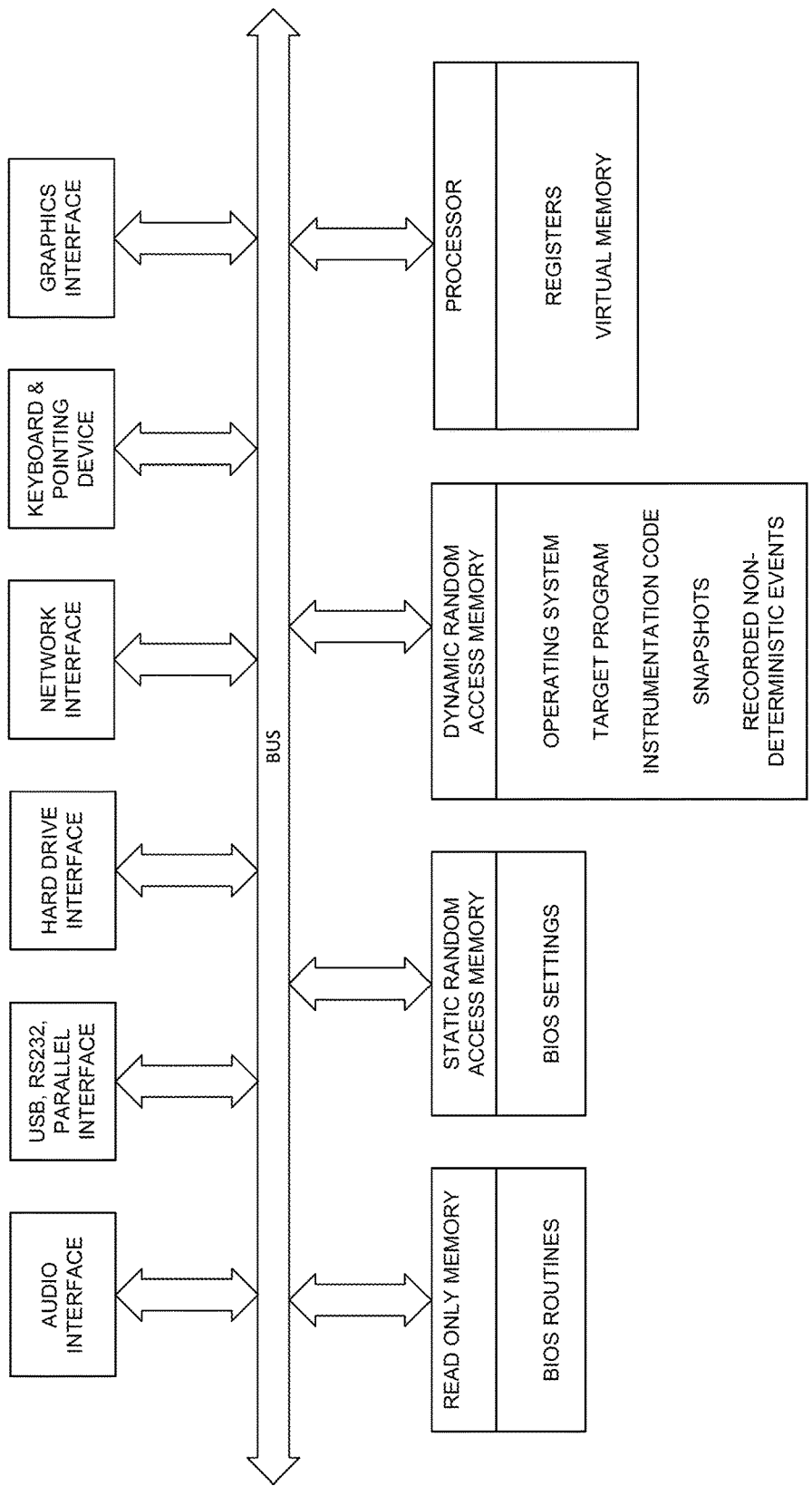
FIG. 3 shows an example of a computer system.

FIG. 3 shows an example of a computer system on which the program may be executed and on which bi-directional debugging may be performed. The target program and the debugger both reside in physical memory. Processor registers may be captured and stored in snapshots along with memory used by the target program process. The debugger may operate within the virtual memory environment provided by the processor and the operating system, or it may operate on a single process computer.

Figure 4:
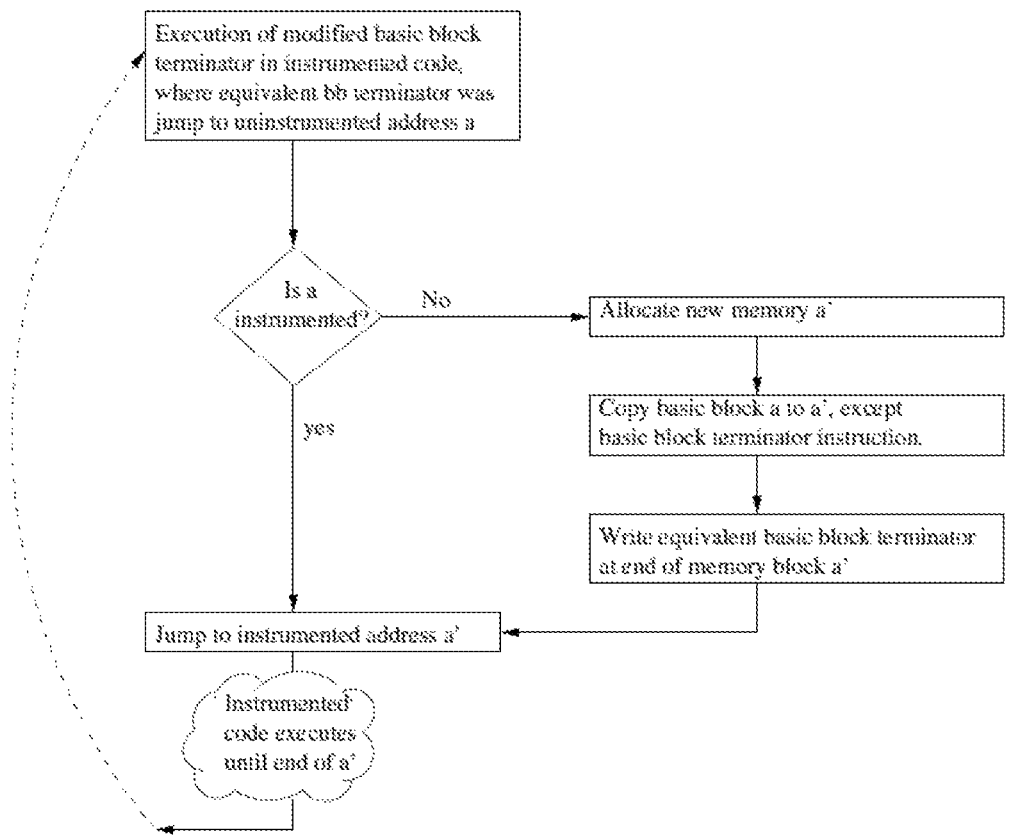
FIG. 4 shows a flowchart showing the instrumentation algorithm.

FIG. 4 shows a flowchart that illustrates the instrumentation algorithm. (Note that algorithm instrumented code in an 'on-demand' fashion, as that program executes; an ahead of time algorithm is also practical.)

Figure 5:
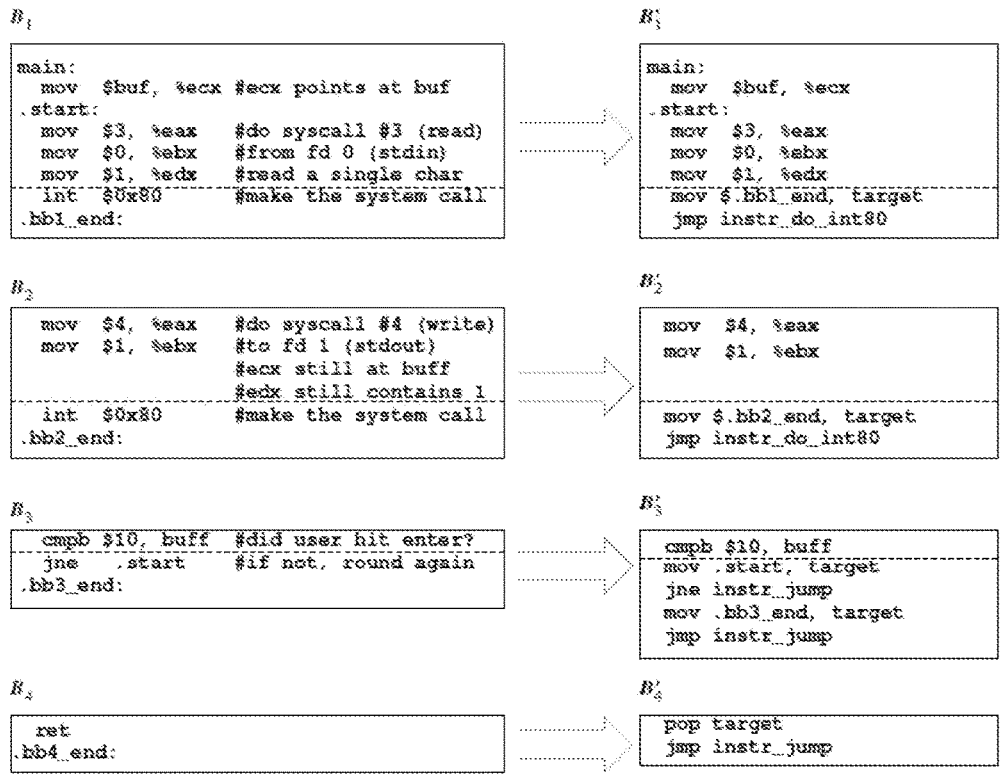
FIG. 5 shows the program P and its instrumented counterpart P'.

FIG. 5 shows the program in the previous example broken into its four basic blocks, and how those basic blocks are copied, and how the basic block terminator instruction for $B_n$ is replaced in $B'_n$ with one or more instructions that branch into the instrumentation code. The label target is used to store the uninstrumented address at which control would have proceeded in the uninstrumented version of the program; the instrumentation code will convert this to the address of the corresponding instrumented basic block and jump there.

The copying and modifying of basic blocks for instrumentation may be carried out statically before the program is executed, or may be done dynamically during the program's execution (i.e. on demand). Here, when the instrumentation code looks up the address of an instrumented basic block given the corresponding uninstrumented address, if the instrumented version cannot be found then the uninstrumented block is copied and the basic block terminator translated. (Our implementation uses the dynamic approach.)

We will next describe making replay deterministic. Using the instrumentation technique described in 3 we are able to remove all sources of non-determinism from a process. We deal with each of the four kinds of determinism separately in subsections below.

Non-deterministic instructions: During the reference execution the results of all non-deterministic instructions (including system calls) are recorded in an event log. When playing a process forwards from a snapshot in order to recreate a previous state, the process is said to be in 'replay mode'. Here, the instrumentation code ensures that non-deterministic instructions are not executed, and instead their results are synthesised using data stored in event log. There the process' internal state is artificially reconstructed to reflect the results of the corresponding non-deterministic instruction produced during the reference execution.

For example, when replaying a system call, this means restoring the system call's return code, as well as any of the process's memory that was modified as a result of the system call.

External state (operating system resources): Note that it is not necessary to reconstruct the process' external state when recreating the results of non-deterministic instructions, because the process' interaction with its external state is in general governed entirely through system calls. For example, consider a process the opens a file for reading during the reference execution. The process will receive a file descriptor (also known as a file handle) which it will use with future calls to the OS to read from the file. The file descriptor is obtained and used with system calls. These system calls will be shortcut in the replay process. In effect, the instrumentation code will ensure that the replay process 'believes' that it has the file open for writing, but in fact it does not.

However, this is not true for OS resources that are visible from the process' internal state. As an example, consider a call to the OS to expand a process' address space (i.e. the memory it can access). Since this affects a resource which the replay process will access directly (i.e. memory), this system call should be reissued on replay to ensure that the effects of the non-deterministic instruction in question are faithfully replayed.

Note that memory mapped files are not treated specially; the entire contents of the file that is mapped are preferably recorded in the event log so that the effects of the memory map operation may be replayed. This is because the memory mapped file may be in a different state (or may not even exist) during replay. However, it is possible to optimise this case by recording and replaying the on-demand mapping of pages of such files. Here, when a process maps a file during the reference execution, the instrumentation code ensures that the process does not really map the file, although the instrumented program is 'unaware' of this. This means that when the process attempts to access the pages of the file it believes are mapped, it will fault. The instrumentation code intercepts these faults, and maps the pages from the file, recording the contents of those pages in the event log. On replay, again the file is not mapped. However, this time when the replay process faults accessing the pages, the instrumentation code obtains the contents of those pages from the event log, and maps the pages and initialises them appropriately. Alternatively, memory mapped files may be considered as shared memory, and dealt with as described below.

Asynchronous events: It is important that asynchronous events are replayed substantially exactly as they occur during the reference execution. During the reference execution, we use instrumentation to obtain a sufficient level of control over when asynchronous events happen, so that these events may be faithfully reproduced in replay mode. This means that all asynchronous events are preferably delivered to the instrumented program at basic block boundaries.

Asynchronous messages: Many modern operating systems provide a facility where an application can register an asynchronous event handling function. When the asynchronous event occurs, the operating system interrupts the program, transferring control directly to the handler function. When the handler function returns, the program proceeds as before interruption. This mechanism may be referred to as asynchronous signal delivery, or software interrupt servicing.

Such asynchronous events are preferably controlled to ensure that they are essentially entirely repeatable. To achieve this, during the reference execution, the instrumentation code intercepts system calls to set up a handler for an asynchronous message. The request is manipulated such that the instrumentation intercepts asynchronous messages.

Figure 6:
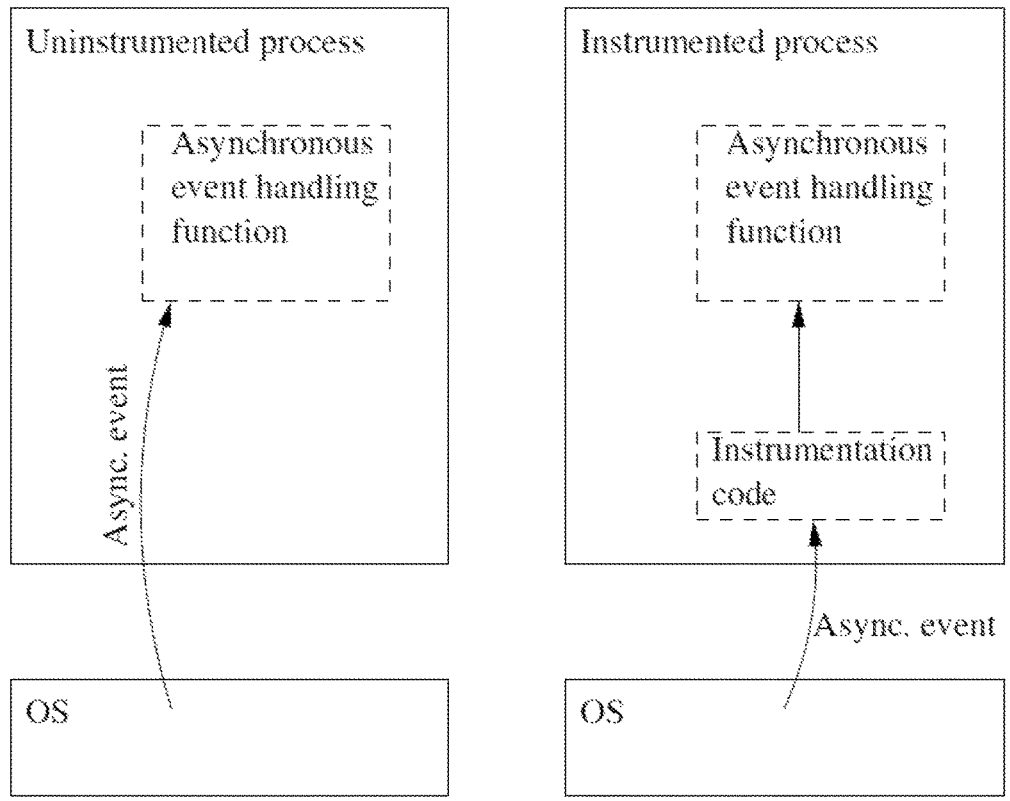
FIG. 6 shows interception of asynchronous events.

This is depicted in FIG. 6. The instrumentation code does not deliver the asynchronous notification directly to the program (i.e. it will not directly call the program's asynchronous event handler function). Instead the instrumentation code's event handling function record the asynchronous event to the event log, and then arrange for the event handler to be executed under the control of instrumentation.

When replaying, asynchronous events are not delivered to the replay process at all. Instead, each time a basic block is executed, the event log is checked. If an event is scheduled for the current basic block, then the process's event handling function is called, thus faithfully replaying the asynchronous event.

As well as providing determinism, this mechanism also ensures that the asynchronous event handling function is instrumented when it is called. Otherwise, if the operating system is allowed to call the program's event handling function directly, then the original, uninstrumented code will be called, and we will 'lose' instrumentation.

Note that message-based systems such as Microsoft Windows® use a system call to retrieve the next message from a message queue; the mechanism outlined above covers this case.

Threads: There are two main ways to implement multi-threading within a process: kernel managed threads, and user managed threads. With user-managed threads, a user-mode library is responsible for threading. Thread pre-emption is performed by the library by responding to asynchronous timer events—hence any non-determinism resulting from user-managed multithreading can be removed using the techniques described above with reference to Asynchronous events.

However, most modern computer systems use kernel-managed threads. Here the operating system kernel is responsible for switching and otherwise managing threads, in general entirely without direct support from the application. There are several mechanism that can be employed to obtain deterministic kernel-managed threads.

One technique is to use the instrumentation code to implement 'virtual-kernel-managed threads', which involves the instrumentation code effectively providing user-managed threads, but letting the application 'believe' it is using kernel managed threads. Here, the system call to create a new kernel managed thread is intercepted by the instrumentation code, and subverted such that the instrumentation code creates a virtual kernel-managed thread within the single real kernel managed thread. The instrumentation code multiplexes all virtual kernel-managed threads onto a single real kernel-managed thread. This means that thread switching is under control of the instrumentation code and can be made essentially entirely deterministic. The instrumentation code can provide pre-emptive multithreading by effecting a virtual kernel-managed thread switch every n basic blocks (e.g. where n=10,000).

Here, care must be taken if we wish to ensure deadlock is avoided. If a virtual kernel-managed thread blocks waiting for the action of another virtual kernel-managed thread, since both virtual threads are running within a single real thread, deadlock can result. (A particularly common example of this problem is when two virtual kernel-managed threads contend on a mutual exclusion primitive; if care is not all virtual kernel-managed threads will deadlock). One way to avoid deadlock on a UNIX system to periodically arrange for the process to be delivered an asynchronous timer signal, such that blocking system calls will be interrupted, returning EINTR.

An alternative mechanism involves letting the program create kernel-managed threads as normal, but subverting the thread creation such that the instrumentation code has control over which thread is executing at which time. This might involve modifying the threads' priorities such that the instrumentation code can control which thread the OS will execute, or perhaps artificially blocking all but one thread at a time by e.g. having all kernel managed threads contend on a single kernel-managed mutex (which we shall call 'the debugging mutex'). This technique would also suffer a similar deadlock problem referred to above. Here if the kernel-managed thread that owns the mutex waits for an operation to be completed by another thread, the system will deadlock. (This is because the other thread will never be able to complete its work because it is waiting for the debugging mutex, yet the thread that owns the debugging mutex will never release it because it is waiting for that other thread.) Fortunately, the only way a thread can block awaiting the result of another is through a system call. Therefore, this problem can be overcome by ensuring that any thread drops the debugging mutex before entering any system call that may block, and then takes it again on return from said system call (note that there is no problem if a thread "busy-waits" because eventually it will execute a maximum number of basic blocks and then drop the debugging mutex). However, if the debugging mutex is to be dropped when a system call is issued, care must be taken to ensure that the system call does not modify the program's internal state in a way that voids determinism. For example, if the system call is reading data off the network and writing that data into the program's address space while concurrently another thread that holds the debugging mutex is reading that same memory, non-deterministic behaviour will result. Fortunately, this problem can be avoided be having the system call read not into the program's internal state, but into the event log. After the debugging mutex has been taken on behalf of the thread that issued the system call, then the data that was read by the system call into the event log can then be copied into the program's internal state. This trick can be implemented with relatively little work, since we already have the requirement that system calls that write into user memory have their results stored in the event log. Therefore, rather than have the system call read into program memory and then copying that data into the event log, we instead subvert parameters to the system call such that data is read directly into the event log, and have the instrumentation code subsequently copy from the event log into program memory, but only once the debugging mutex has been taken.

Shared memory: If a process being debugged shares memory with another process, it is possible to exploit the operating system's memory protection mechanism to provide deterministic replay.

Suppose that there are two processes, A and B, that share some portion of memory M, such that both processes have read and write permissions to access M. Process A is being run under instrumentation for bidirectional or backwards debugging, but process B is not. The shared memory M is initially mapped such that process B has read-only access, and A has full access. We describe this situation as process A having ownership of memory M. Any attempt by process B to read memory M will succeed as normal, but any attempt by process B to write to M will result in a page fault. This fault is responded to by memory M being mapped read/write to process B, and unmapped completely from process A. We refer to this process B taking ownership of the memory. Here, any attempt to access M (either for reading or for writing) by A will result in a page fault. This is responded to by reverting ownership of M to A, but in addition sufficient state being stored in the event log to replay the changes to M made by B. That is, the difference of the memory M between the point when A last had ownership of that memory and the current time is stored in the event log.

When replaying, the difference in memory is retrieved from the event log and applied at the appropriate time. Thus the effect on A of B's asynchronous modification of memory M can be replayed deterministically.

Note that the above scheme can easily by generalised so that process B is actually a group of one or more processes.

An alternative approach is to record in the event log every memory read performed by A on the shared memory M. This has the advantage of being a simpler implementation, but depending on the usage of the shared memory may result in the recording of an unacceptable amount of state in the event log, as well as adversely affecting temporal performance.

We will next describe implementation and structure of the event log. As we have seen, there are several kinds of events that need to be recorded in the event log: Non-deterministic instruction results (including the return codes and memory modifications made by system calls), Asynchronous events (including asynchronous signal delivery), Thread Switches, and Shared memory transactions.

Preferably the memory used to store the event log is accessible by the process in record and replay mode. This means that if the UNIX fork facility is used to snapshot processes, then the memory used to store the event log should be shared between each process created with these forks. However preferably the event log (and all memory used by the instrumentation code) is not usable as the internal state of the program being debugged; to prevent this all memory transactions by the program being debugged can be intercepted by the instrumentation code, and access to memory used by the instrumentation code (including the event log) can be denied to the program being debugged.

Preferably the event log itself is stored as a linked list, where each node contains the type of event, data sufficient to reconstruct that event during replay, and the time at which that event happened (where time is based on the number of instructions executed to that point or some approximation thereof, preferably combined with the number of non-deterministic or asynchronous events executed to that point).

Then when in replay mode, between each basic block it is necessary only to inspect the current time, and compare it with the time of the next non-deterministic event in the event log. In the common case that the current time is less than the time for the next non-deterministic event, the coming basic block can be executed without further delay. If there is a non-deterministic event to replay in the coming basic block then the instrumentation must arrange for the effects of the said non-deterministic event to reconstructed at the corresponding time in the coming basic block.

We will next describe searching history. In general, it is more useful for a bidirectional or backwards debugger to be able to search history for a particular condition, as opposed to wind a program back to an absolute, arbitrary time. Some examples of the kinds of conditions it is useful to be able to search are:

The previously executed instruction

The previously executed source code line

The previously executed source code line at the current function call depth

The call site for the current function

The previous time an arbitrary instruction or source code line was executed

More generally, it is useful to be able to rewind a debugged program to the previous time an arbitrary condition held, such as a variable containing a given value, or even completely arbitrary conditions, such as some function returning a particular value.

We have implemented an algorithm to search an execution history for such arbitrary conditions. The most recent snapshot is taken, and played forward testing for the condition at the end of each basic block. Each time the condition holds, the time is noted (if a time is already recorded because the condition held earlier, it is overwritten). When the history is replayed up to the debug point, the most recent time at which the condition held will be stored. If no such time has been recorded because the condition did not hold since the most recent snapshot, then the search is repeated starting from the next most recent snapshot, up to the most recent snapshot. That is, suppose that the debugged program is currently positioned at time 7,000, and there are snapshots at times 0; 2,000; 4,000; and 6,000. We start at the snapshot at time 6,000 and play forwards until time 7,000, testing for the condition between each basic block. If the condition never holds between times 6,000 and 7,000, then we rewind to the snapshot taken at 4,000, and play that forwards to 6,000, searching for the event. If the condition still isn't found to hold, we check 2,000-4,000, and so on.

Note that this algorithm will not work reliably with the instrumentation technique of FIG. 4 if searching for the most recent time at which a variable held a particular value. This is because a variable's value may change to and then from the required value entirely within a basic block. To overcome this, there is an enhancement to the instrumentation technique shown in FIG. 4—each memory write operation is considered a basic block terminator. (This approach can also be used to ensure that a program that has gone hay-wire does not write over the event log or other instrumentation data structures.) This form of instrumentation will operate less efficiently than the one shown in FIG. 4; however should the performance become problematic, it is possible to run with both forms of instrumentation, switching between the two as necessary.

(Note that the algorithm described in this section does work reliably when searching for particular values of the program counter with the instrumentation technique shown in FIG. 4.)

We have described a bidirectional or backwards debugging mechanism that can be conveniently implemented on most modern operating systems for example including, but not limited to, Linux and Windows®. A process can be rewound and its state at any time in its history can be examined. This is achieved by regularly snapshotting the process as it runs, and running the appropriate snapshot forward to find the process' state at any given time. Non-determinism may be removed using a machine code instrumentation technique.

Our implementation for the Linux operating system is responsive and pleasant to use, and promises to greatly reduce debugging times for particularly subtle and difficult bugs. We have also implemented a searching technique that permits the most recent time that an arbitrary condition holds in a process's history.

Our technique of instrumenting machine code rather than source-level analysis is particularly important, because it means the system copes with bugs where the compiler-dictated control flow is subverted (e.g. overwriting a function's return address on the stack).

Further Techniques for the Deterministic Replay of Computer Programs

We now describe some further techniques for instrumenting execution of a computer program such that sufficient information may be recorded in an efficient manner to provide deterministic replay of the said computer program in the light of shared memory accesses, and when the said computer program is multithreaded.

Techniques we describe for identifying processes with shared memory access, such as threads or multicore processes, comprise arranging process (thread) memory ownership to deliberately provoke memory page faults, to identify and handle concurrent memory access by multiple threads in such a manner as to enable deterministic replay, and hence backwards debugging.

Deterministic replay of a recording of a computer program can be achieved providing that (a) the program is replayed using the same starting state as the recording, and (b) inputs and other non-deterministic effects are synthesised to be replayed exactly as occurred during the recording. Such sources of non-determinism include:

i) non-deterministic instructions, including system calls (e.g. reading from a file or network)

ii) asynchronous signals iii) reads from shared memory iv) ordering of accesses to memory by concurrent threads Here we describe techniques to address both (iii) and (iv) by using the MMU (memory management unit) to fault in (i.e. trap) accesses to certain memory locations and use such traps to determine the ownership of memory and track different users of the memory.

Shared memory: We define "shared memory" as memory whose contents when a given location is read by the program being debugged does not necessarily return the value most-recently written to that location by the program being debugged. Typically this is because the memory is shared with another program which may write a new value to the memory location between the program being debugged writing and reading it back. Shared memory may also be updated in such asynchronous fashion by the operating system (asynchronous IO), or by a device to which the program being debugged has direct access (e.g. with kernel-bypass IO such as Direct Memory Access, also known as DMA).

One way to record reads from shared memory such that they may be later replayed non-deterministically is to instrument all reads from memory, and for each access determine whether the address of the memory read is shared memory, and if it is, record to the event log the value read from shared memory. This imposes significant overheads, in particular, every single access to shared memory must be checked.

A better way is to use the system MMU to determine which instructions access shared memory. Here, all shared memory is remapped to a new virtual address, which is unknown to the program being debugged. This is termed the "really shared memory". In its place is mapped a new mapping, which we refer to as the "emulated shared memory". The MMU is programmed (e.g. via a call to mprotect on the Linux operating system) such that any access to the emulated shared memory shall result in a memory protection fault (also referred to as a memory protection trap). All such faults are intercepted, and in response to this the code that triggered the fault is retranslated such that when accessing memory it first checks the address to determine whether it is shared, and so (a) redirects the access to the "really shared memory" address, and (b) stores values read from the really shared memory location in the event log for later deterministic replay.

A further optimisation is to record in the event log only those shared memory locations that have been modified since the previous access by the program being debugged. To achieve this, a third mapping accompanies the "emulated shared memory" and the "really shared memory", which is known as "the third copy". The third copy is kept in sync with the really shared memory from the perspective of the program being debugged (in other words with the logical contents of the emulated shared memory, in that it contains the contents of the shared memory that will be read at the corresponding time during replay). On access to the shared memory by the program being debugged, an event is added to the event log only if the really shared memory and third copy differ.

The algorithm for a retranslated instruction that accesses shared memory is:
For each address A, that the instruction accesses:
  If address A is shared:
    compute address A1 as the equivalent really shared memory address
    compute address A2 as the equivalent third copy address
    allocate a temporary variable T1
    If the instruction reads at A
      If the instruction also writes at A
        lock address A1
      copy contents of A1 into T1
      if the instruction reads at A and the contents of T1 differs from the contents of A2:
        copy contents of T1 into A2
        create a new event in the event log to indicate that this read from
        address A should be replayed to use the value now in T1.
      substitute T1 for A in the instruction
Execute instruction as modified
For each address A, . . . that the original unmodified instruction would access:
  If the instruction writes at A and address A is shared
    copy contents of T1 into A1
    If the instruction also reads at A
      unlock address A1

Locking an address prevents any other process from writing to it. The mechanism used to lock and unlock an address depends on the facilities provided by the hardware. On some types of computer, it may be possible to simply lock and unlock as described. On others, it may be possible only to determine whether another process has changed the contents of the address before writing back to it, and if so repeat the algorithm above again.

For the vast majority of programs, even those that make relatively heavy use of shared memory, the proportion of instructions actually accessing the shared memory is relatively small (compared e.g. to accesses to the stack). This technique ensure that only the relatively small proportion of instructions that access the shared memory have the extra overhead of dealing with shared memory, whereas most instructions run entirely unencumbered.

Multithreaded execution: The simplest way to deal with non-determinism due to differently-ordered accesses to memory by concurrent threads is to force serialisation of all threads when recording, and ensure that during deterministic replay each thread is executed in the same order as during record. In short, this means serialising all threads and recording thread switch events in the event log. However, such serialisation is unfortunate because it (a) slows down execution on multicore systems (i.e. only one of the CPU cores can be used at any one time), and (b) it changes the behaviour of the system compared to it being run normally (such lower fidelity can be mean bugs that are being investigated do not appear under the control of the debugger).

Here we present an improved mechanism that allows concurrent threads (processes) to be executed on multiple cores concurrently. It relies on the observation that multiple threads within a single (common) program is a similar arrangement to multiple programs using shared memory. i.e. the main difference between multiple threads and multiple programs is that multiple threads share memory. A variation on the technique described above for supporting deterministic replay of programs using shared memory can be used, allowing concurrent threads to be replayed without requiring strict ordering of memory accesses between those threads.

The idea is based on the observation that most memory locations referenced by most multithreaded programs will not in reality be "shared" between the multiple threads (e.g. most stack accesses are local to a specific thread). If memory within the program can be assigned an owning thread, and each thread is given its own event log, threads' accesses to memory locations that they do not own can be treated as accesses to conventional shared memory, as described above and threads' accesses to memory locations that they do own can proceed as normal.

Here, each memory location (or group of memory locations such as a page), is in one of the following states:
  unused (all memory is initially in this state)
  single-threaded (i.e. owned by a single thread; said thread is the only thread recently to have accessed this memory)
  multithreaded—i.e. shared between multiple threads (more than one thread has recently accessed the memory)

Memory locations can change ownership over time in the following ways:
  from unused to single-threaded,
  from single-threaded to unused, or
  from single-threaded to multithreaded, or
  from multithreaded to unused (ownership need never directly change from one thread to another). When recording, any read or write of memory address P by a thread T1 results in different behaviour depending on the ownership of memory P:

Memory P is already owned by thread T1: continue as normal.

Memory P is currently unused: thread T1 takes ownership of memory P, a memory ownership event is added to T1's event log, and then continue as normal.

Another thread T2 owns memory P: memory P is marked as multithreaded, a memory ownership event is added to T2's event log, and the memory access continues as for shared memory accesses described above.

Memory P is multithreaded: the memory is accessed as per conventional shared memory as documented above; if necessary, a memory-read event is added to T1's event log.

It is desirable to allow memory locations to be changed from multithreaded to single-threaded in the case that the memory's access pattern changes (e.g. perhaps the memory is on the heap, and is being used by multiple threads but is then freed and then reallocated for use by a single thread). To facilitate such a case, associated with each multithreaded memory location P is:

An identifier Tprev describing the most recent thread to access it, and

An integer N that holds of the number of consecutive accesses to it by thread Tprev For each access to multithreaded location P by thread T1, if P's Tprev is not T1, then P's Tprev is set to T1 and P's N is set to 0; otherwise, P's N is incremented. If P's N exceeds some threshold, the memory P is marked as being single-threaded and owned by T1, and a memory ownership event is added to T1's event log.

When replaying, it is important to synchronise memory ownership events to preserve ordering of memory accesses between threads. Specifically, when thread T1 replays a memory ownership event such that it becomes the owner of memory P, it should not proceed until the previous owner thread T2 has replayed its memory ownership change event marking the corresponding memory as not owned by it.

To implement this model, it is desirable to be able to reliably track which memory locations are accessed by which threads.

Implementation: The overheads of running on multiple cores concurrently (as opposed to running serially) will depend on the following factors (the values of which will depend on the implementation):

the relative proportion of the memory accesses by a thread that does not already own the memory being accessed, and the extra overhead incurred by a thread when accessing memory that it does not own (i.e. the memory is multithreaded), and the extra overhead incurred by a thread when accessing memory that it does own (i.e. the memory is single-threaded)

Three possible implementations are described below, each with different trade offs. In particular, the MMU can be used to trap accesses by a thread to memory which it does not own. This is attractive as it implies no extra overhead for a thread accessing memory it does own. Multiple threads within a process are not usually able to have different MMU mappings, but below we describe two ways this can be achieved (i and ii). A third implementation alternative (iii) is suggested, whereby the MMU is not used. This imposes some overhead even to accesses to single-threaded memory (as ownership must first be checked), but at the benefit of lower cost of accessing multithreaded memory.

i. MMU-based multiprocess: As alluded to above, multiple threads within a process is logically equivalent to multiple processes sharing memory. For each thread created by the program being debugged, in reality a new process is created, where all the memory is shared with the other "threads" of the program being debugged (where these other "threads" are in reality other processes).

Memory not owned by a thread (where in this context thread is in reality a process) should be mapped into the process at a different virtual address (effectively the "really shared mapping", as described above). Each process should also maintain a "third copy" for memory it does not own, again as described above.

In such an implementation, care would need to be taken to ensure correct operation of pan-process resources, including file-descriptors, signal handlers, resource limits, and newly-created memory mappings. In Linux, it is possible to create new processes with the CLONE_FS and CLONE_FILES flags, which eases this problem. Maintaining a perfect illusion of different processes being the same process may still be difficult to achieve, however.

For example, as will be appreciated, each process is allocated a process identifier when the process is created. Each thread belonging to a process will be allocated a thread identifier based on the process identifier of the process that the thread belongs to. However, under the scheme where a thread is executed as a new process, the thread will have a different thread identifier than it would if it were created as a thread of the original process.

This difference in thread identifiers may cause issues where it is necessary that the correct originating thread identifier is required. System calls are one such instance where having the correct process or thread identifier is necessary in order for the correct action to be taken in response to the system call. For example, the correct process identifier is necessary for updating the correct file descriptor table where the "open( )" system call is used. As such, an improved method for handling system calls in this type of environment is required.

Figure 7A:
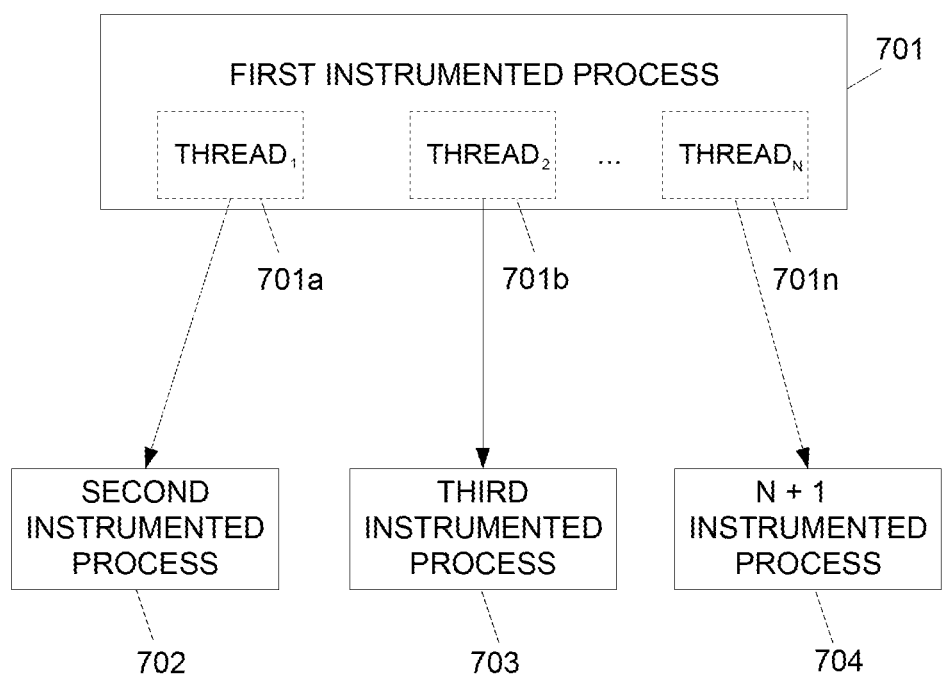
FIGS. 7A and B are schematic illustrations of a system comprising further instrumented processes based upon a plurality of threads in a first instrumented process.

Referring to FIG. 7A, a first instrumented process 701 comprises a plurality of execution threads 701a . . . 701n. A second instrumented process 702 may be generated based upon a first thread 701a of the plurality of execution threads. For example, the second instrumented process 702 may be generated upon initialisation of the first thread 701a. Further instrumented processes 702, 703 may be generated based upon other threads of the plurality of execution threads as shown in FIG. 7A.

The second instrumented process 702 executes the code of the thread 701a that it is based upon instead of that code being executed by the thread 701a within the first instrumented process 701, in accordance with the techniques described above. However, where a system call is to be executed, the system call is delegated back to the first thread 701a within the first instrumented process 701 for execution such that the origin of the system call can be correctly identified and the system call can be executed correctly.

After the execution of the system call, any data arising from the execution of the system call required for correctly resuming the execution of code by the second instrumented process is provided from the first instrumented process to the second instrumented process. The second instrumented process may then resume execution of the thread code.

Figure 8A:
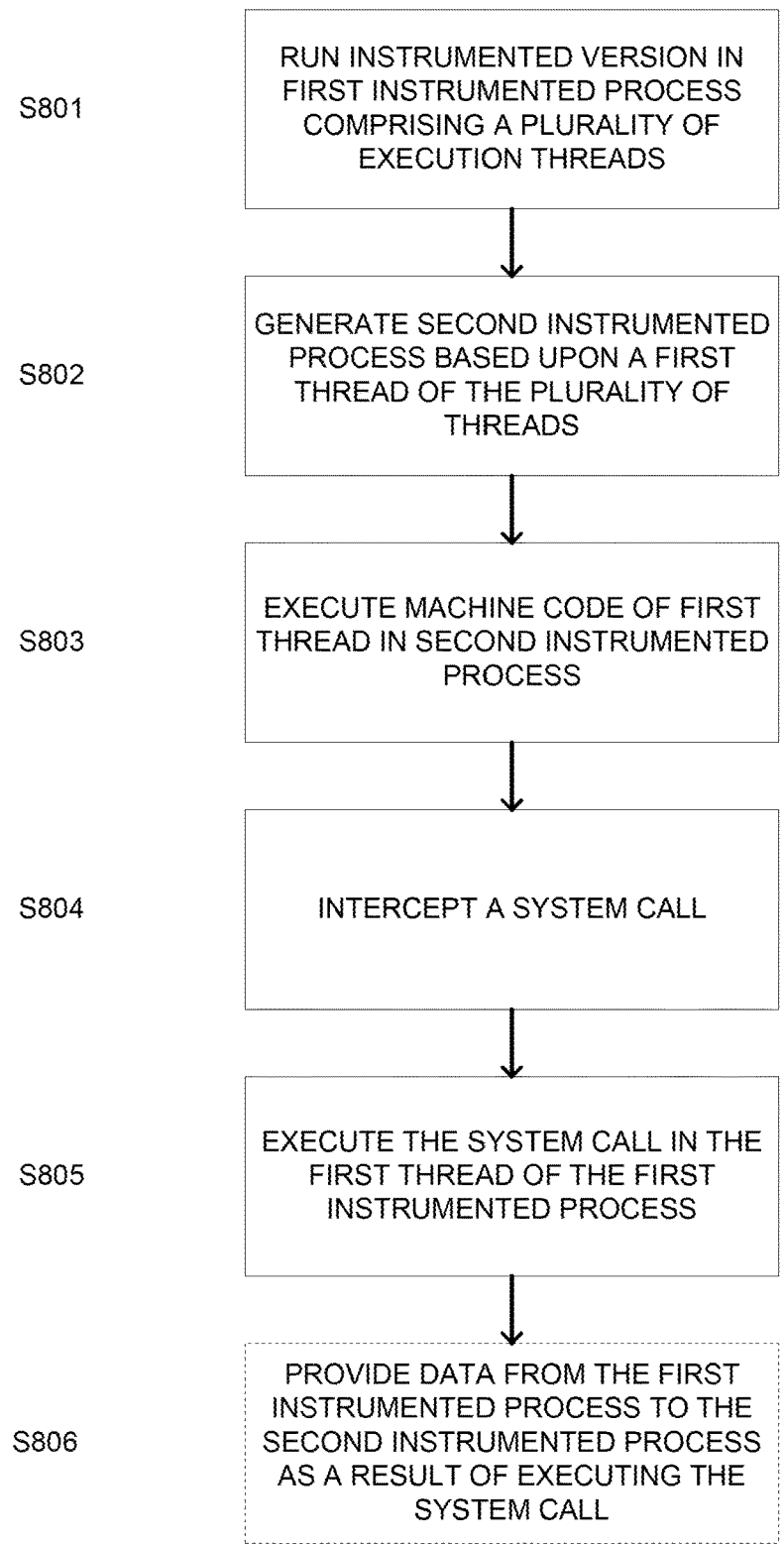
FIGS. 8A and 8B are flowcharts showing processing carried out for executing a system call.

Referring now to FIG. 8A, processing for executing a system call performed by the components of FIG. 7A is described. At step S801, an instrumented version of machine code providing a computer program is executed in a first instrumented process. As depicted in FIG. 7A, the first instrumented process 701 comprises a plurality of threads

701a ... 701n. At step S802, a second instrumented process 702 is generated based upon one of the plurality of threads 701a of the first instrumented process 701. The machine code of that thread is executed in the second instrumented process 702 at step S803.

The machine code executed in the second instrumented process 702 includes one or more system calls. A system call made during the execution of machine code in the second instrumented process is intercepted at step S804. The intercepted system call is executed by the first thread 701a within the first instrumented process 702 at step S805.

Processing may further include step S806, whereby data resulting from the execution of the system call in first thread 701a within the first instrumented process 701 is provided from the first thread 701a within the first instrumented process 701 to the second instrumented process 702. For example, where the execution of the system call itself is self-contained and has no effect on any other process during the execution of the system call, the portion of data that is provided may be a return value of the system call. Examples of system calls that have no such side-effects include, getpid( ), gettid( ), gettimeofday( ), readlink( ), in which case any data returned by the system call may simply be passed back to the second instrumented process.

Where execution of the system call is not self-contained, for example, where any input/output buffers are used by the system call, these may need to be synchronised between the first and second instrumented processes to ensure correct behaviour of the resumed execution of the machine code in the second instrumented process.

The second instrumented process generated at step S802 may, for example, be created using the UNIX fork system call to create a child process comprising the machine code of the thread. In general, the second instrumented process will have state information different to that of the first thread within the first instrumented process, such as a separate file descriptor table. However, the second instrumented process may share some process state with the first thread within the first instrumented process. For example, certain areas of memory may be shared between the two processes for communication and control purposes as will be described later.

The system call may be intercepted through instrumentation using the techniques described above. For example, the system call instruction in the second instrumented process may be translated to perform the necessary actions to enable the first thread within the first instrumented process to execute the system call.

In more detail, execution of the system call may be implemented based upon a remote procedure call. In addition, a mutual exclusion mechanism, such as a semaphore, may be used to ensure that the execution of operations between the first thread within the first instrumented process and the second instrumented process is carried out in the correct order.

Figure 9:
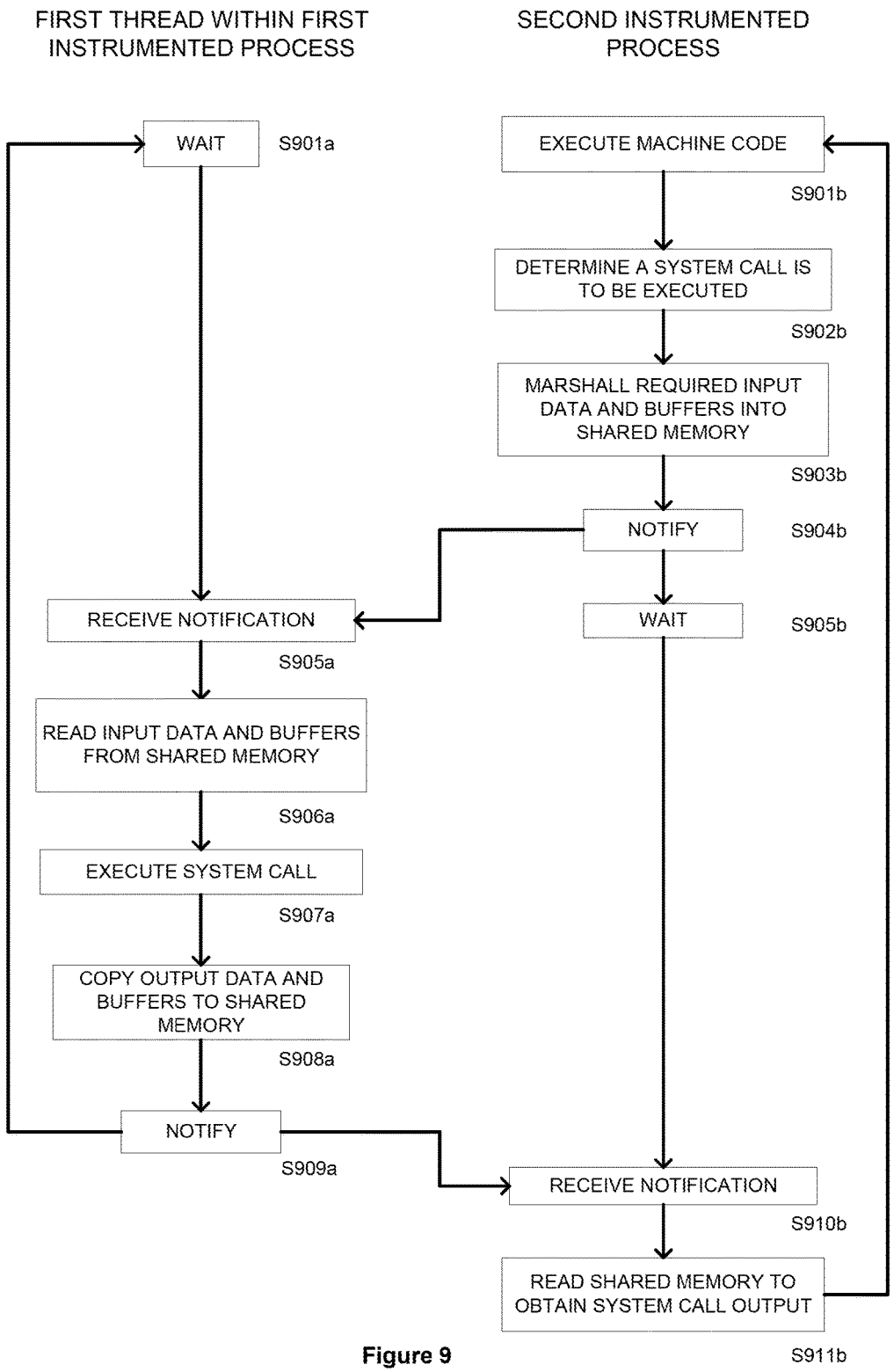
FIG. 9 is a flowchart showing the processing of FIGS. 8A and 8B in more detail.

An exemplary implementation is described in FIG. 9, in which execution of machine code is currently being carried out by the second instrumented process as shown at step S901b. At this point, as shown at step S901a, the first thread within the first instrumented process awaits a signal from the second instrumented process to begin execution of a system call.

At step S902b, it is determined that a system call is to be executed. At step S903b, the instrumented code in the second instrumented process marshalls the required input parameters and any input buffers into an area of memory shared between the two processes in preparation for executing the system call by the first thread within the first instrumented process. Once such preparations have been completed, at step S904b, the instrumented code in the second instrumented process notifies the first thread within the first instrumented process, for example, by modifying a semaphore. Modification of the semaphore also prevents the second instrumented process from continuing execution until the system call has been executed by the first thread within the first instrumented process. As such, at step S905b, the second instrumented process waits for a signal that the system call has been executed.

At step S905a, the first thread within the first instrumented process receives the notification provided by the second instrumented process. Having received the notification, at step S906a, the first thread within the first instrumented process reads the data that has been copied into the area of shared memory and at step S907a, executes the system call based upon the read input data.

Upon completion of the system call, at step S908a, any output data and buffers are copied to the area of shared memory and the second instrumented process is notified that execution of the system call has been completed at step S909a. Again, this may be achieved through modification of the semaphore which also has the effect of preventing the first thread within the first instrumented process from performing further operations until the semaphore is modified to re-enable execution by the first thread within the first instrumented process. Processing therefore returns to step S901a as the first thread within the first instrumented process enters into a wait mode.

At step S910b, the second instrumented process receives the notification that system call has been executed and at step S911b, the second instrumented process reads the area of shared memory to obtain the output of the system call. Processing returns to step S901b and the second instrumented process resumes execution of the machine code on behalf of the first thread within the first instrumented process.

On execution of the system call by the first thread within the first instrumented process at step S805, where the system call is a blocking system call, no special handling procedures are required as may be the case with serialisation of a multi-threaded program in which careful administration of locks may be required to allow other threads to run. The second instrumented process may wait for the blocking system call to return and resume execution.

Further instrumented processes may be generated based upon other threads of the plurality of execution threads in the first instrumented process. The processing of FIG. 8A, may equally be applied to each of these further instrumented processes.

Figure 7B:
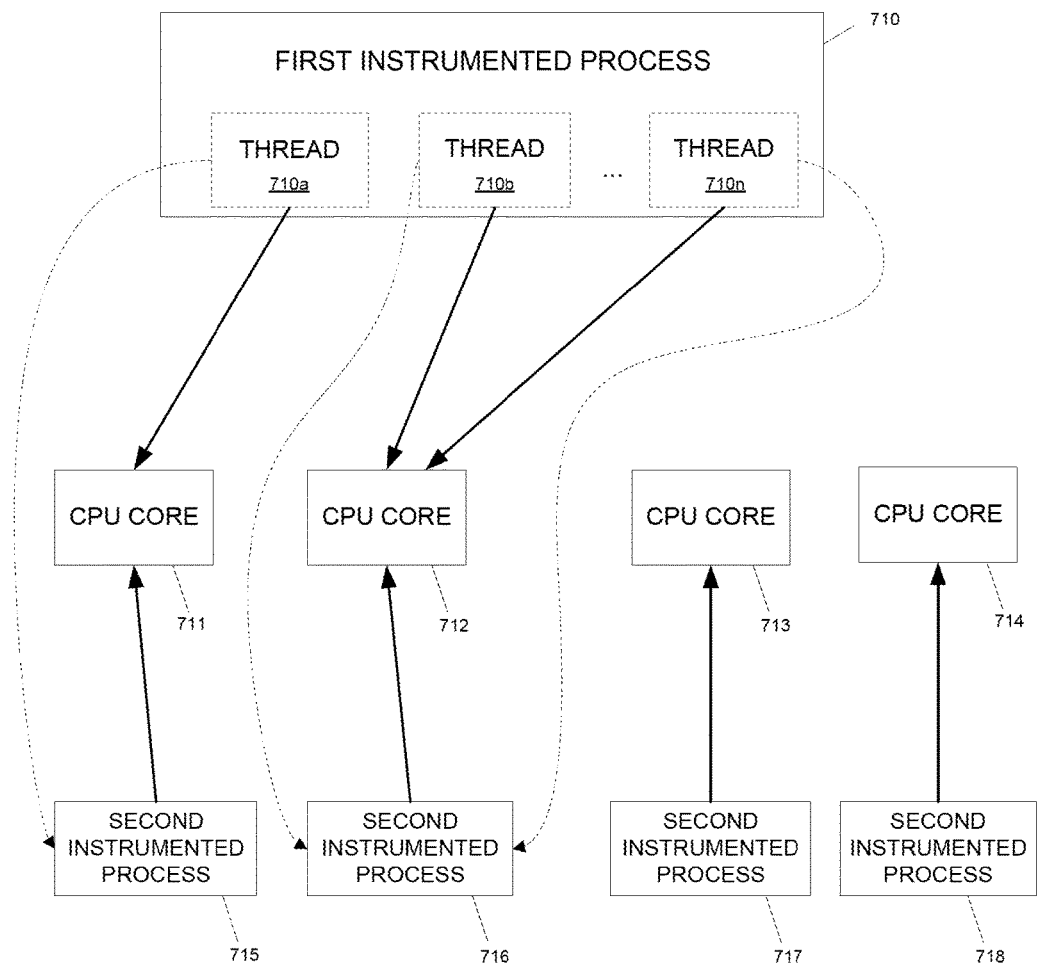

Referring now to FIG. 7B, an alternative system to that of FIG. 7A is shown. Similarly to FIG. 7A, a first instrumented process 710 comprises a plurality of execution threads 710a ... 710n. The system additionally includes a plurality of CPU cores 711-714. Whilst FIG. 7B depicts a system with four CPU cores, it will be appreciated that the system may comprise any number of CPU cores.

Whereas the system of FIG. 7A comprises a second instrumented process 702 generated based upon a first thread 701a of the plurality of execution threads, the system of FIG. 7B comprises a plurality of second instrumented processes 715-718, each of the second instrumented processes being associated with one of the CPU cores 711-714. In particular, as shown in FIG. 7B, second instrumented process 715 is associated with CPU core 711, second instrumented process 716 is associated with CPU core 712, second instrumented process 717 is associated with CPU core 713, and second instrumented process 718 is associated with CPU core 714.

Each thread 710a . . . 710n of the first instrumented process 710 is also associated with a CPU core 711-714. For example, also shown in FIG. 7B, thread 710a is associated with CPU core 711, thread 710b is associated with CPU core 712 and thread 710n is also associated with CPU core 712. It will be appreciated that a thread's CPU core association may change at any point in time. For example, a thread may be associated with a CPU core based upon the CPU core that the thread is currently running on or was most recently run on. In this case, where a thread has not yet started execution, it may not have a CPU core association until it has begun execution or is scheduled for execution. The CPU core that a thread executes on may be selected by a thread scheduler of an operating system and the thread scheduler may switch one thread from executing on one CPU core to another of the CPU cores depending on operating conditions. As such, a thread's CPU core association may change over time and the system of FIG. 7B provides a snapshot at one particular point in time of threads' 710a . . . 710n CPU core associations.

Similarly to the system of the FIG. 7A, each of the second instrumented processes 715-718 executes the machine code of a thread of the first instrumented process 710 instead of that machine code being executed by the first instrumented process 710. However, in the system of FIG. 7B, each second instrumented process 715-718 is not configured to be exclusive to any one particular thread of the first instrumented process 710 and is configured to execute the machine code of any of the threads of the first instrumented process 710. The second instrumented process that executes the machine code of a particular thread of the first instrumented process 710 is selected based upon a CPU core association.

In more detail, the second instrumented process selected to execute the machine code of a particular thread of the first instrumented process 710 is the second instrumented process that has a corresponding CPU core association to that of the particular thread of the first instrumented process 710. For example, second instrumented process 715 may be selected to execute the machine code of thread 710a given that both the second instrumented process 715 and the thread 710a are associated with CPU core 711. Likewise, second instrumented process 716 may be selected to execute thread 710b and thread 710n given that thread 710b, thread 710n and second instrumented process 716 are all associated with CPU core 712.

By selecting a second instrumented process for executing a particular thread of the first instrumented process 710 based on a corresponding CPU core association, the system of FIG. 7B may take advantage of any CPU optimizations in relation to multi-threaded environments and/or in the machine code of a particular thread to improve the efficiency of the system and the recording method. Associating a second instrumented process and a thread of the first instrumented process 710 with a CPU core is described in more detail below.

Where execution of a thread 710a . . . 710n is ready but a selected second instrumented process is not available, for example, if the second instrumented process is busy executing a different thread of the first instrumented process 710, the thread 710a . . . 710n may wait until the second instrumented process becomes available to begin execution of the thread.

Similarly to the system of FIG. 7A, where a system call is to be executed, execution of the system call may be delegated back to the particular thread 710a . . . 710n of the first instrumented process 710 from the corresponding second instrumented process 715-718. In this way, any thread-specific kernel data, for example, thread id, resources such as CPU limits and scheduling parameters amongst others, will be correct from the point of view of the kernel of the operating system and enables correct operation of the system call.

After the execution of the system call has been completed, any data resulting from the execution of the system call that is required for correctly resuming the execution of the particular thread of the first instrumented process 710 is provided to the corresponding second instrumented process to ensure synchronisation between the thread and the second instrumented process. It will be appreciated however, that this data synchronisation may be performed at any appropriate time and does not have to occur immediately after the completion of the system call. For example, it is possible that data resulting from the system call is not required until a later time in the execution of the particular thread and as such immediate synchronisation after completion of the system call is not required.

In another example, where it is known that a system call is blocking, in order to improve efficiency, another thread of the first instrumented process 710 may be selected and executed by the corresponding second instrumented process whilst the system call is being executed. Where it is known that a system call completes quickly, it may however be more efficient to wait for the completion of the system call rather than incur the overhead of switching to another thread.

Where another thread of the first instrumented process 710 is selected and executed by a second instrumented process whilst a system call is being executed, once the system call has completed, data may be synchronised when or after the first thread resumes execution on the second instrumented process, which may be dependent on the second instrumented process's availability. It will also be appreciated that the synchronisation data may be provided to a different one of the second instrumented processes than that of the second instrumented process that the first thread was being executed by prior to the occurrence of the system call.

For example, thread 710a may be executing on second instrumented process 715 according to their association with CPU core 711. A system call may occur during execution by the second instrumented process 715 and execution returned to thread 710a. The operating system may, at any time, move execution of a thread to a different CPU core. For example, execution of thread 710a may be moved to CPU core 713 thereby changing the association of thread 710a from CPU core 711 to CPU core 713. Upon completion of the system call, the system may detect this change in the CPU core association of thread 710a and select second instrumented process 717 for resuming the execution of the machine code of thread 710a. As such, data resulting from the execution of the system call will need to be provided to second instrumented process 717.

Alternatively, it may be necessary to synchronise data between the first instrumented process 710 and each of the second instrumented processes 715-718 after completion of the system call. Synchronisation may occur at any appropriate time, for example, it will be appreciated that there may be points in the execution of a multi-threaded program where it is essential that memory is synchronised, such as a transfer of ownership of a mutex. It will also be appreciated that synchronisation of data may be performed asynchronously, that is, without having to temporarily halt each of the second instrumented processes to perform a synchronisation operation. Synchronisation may, for example, be achieved through shared memory using the techniques described above.

In the system of FIG. 7B, one second instrumented process is generated per CPU core. In this way, the system is able to make efficient use of the concurrency provided by a system having a plurality of CPU cores without incurring unnecessary overheads. However, it will be appreciated that other numbers of second instrumented processes are possible and may, for example, be generated based upon a user specified parameter.

A second instrumented process may be associated with a CPU core by binding the second instrumented process to the CPU core. This may, for example, be achieved by setting the CPU affinity of the second instrumented process to the specified CPU core. That is, insofar as is supported by an operating system, it is preferable that the second instrumented process is run only on the specified CPU core.

As mentioned above, each of the plurality of threads 710a . . . 710n of the first instrumented process 710 is also associated with a particular CPU core 711-714. The association may be based upon which CPU core the thread is currently running on or the CPU core that the thread was most recently run on. Such information may be obtained through a system call. The operating system may comprise a thread scheduler which is responsible for allocating CPU time to threads for their execution. The thread scheduler may allocate resources to a thread according to its usual behaviour and does not require any modification. The thread scheduler may allocate a CPU core to a thread based upon any known optimizations, such as minimising cache invalidation, or to respect thread priorities. As such, it may be advantageous to base the selection of the second instrumented process, which is bound to a particular CPU core, on the CPU core that has been previously used for executing the thread. Furthermore, by basing selection of the second instrumented process on the CPU core selected by the thread scheduler, it can be ensured that no deadlocks are introduced that would not have otherwise occurred if execution were to take place in the first instrumented process alone.

A thread of the first instrumented process 710 may be executed at a time chosen by the thread scheduler. When the thread of the first instrumented process 710 begins execution, the thread communicates with the selected second instrumented process to execute the machine code of the thread on its behalf. The first instrumented process 710 may provide the selected second instrumented process with data indicative of the state of the thread, such as a program counter value, to enable correct execution of the machine code by the selected second instrumented process. Execution by the second instrumented process continues until a system call is performed and control is transferred back to the first instrumented process, as described above, or if all of the machine code of the thread has been executed to completion which is typically also indicated by a system call. Alternatively, execution by the second instrumented process may stop if preempted in order to avoid a CPU-bound thread from monopolising the second instrumented process, effectively mimicking the behaviour of the thread scheduler. Any preemption by the thread scheduler itself however, will usually occur as normal without the need for special detection or handling.

Figure 8B:
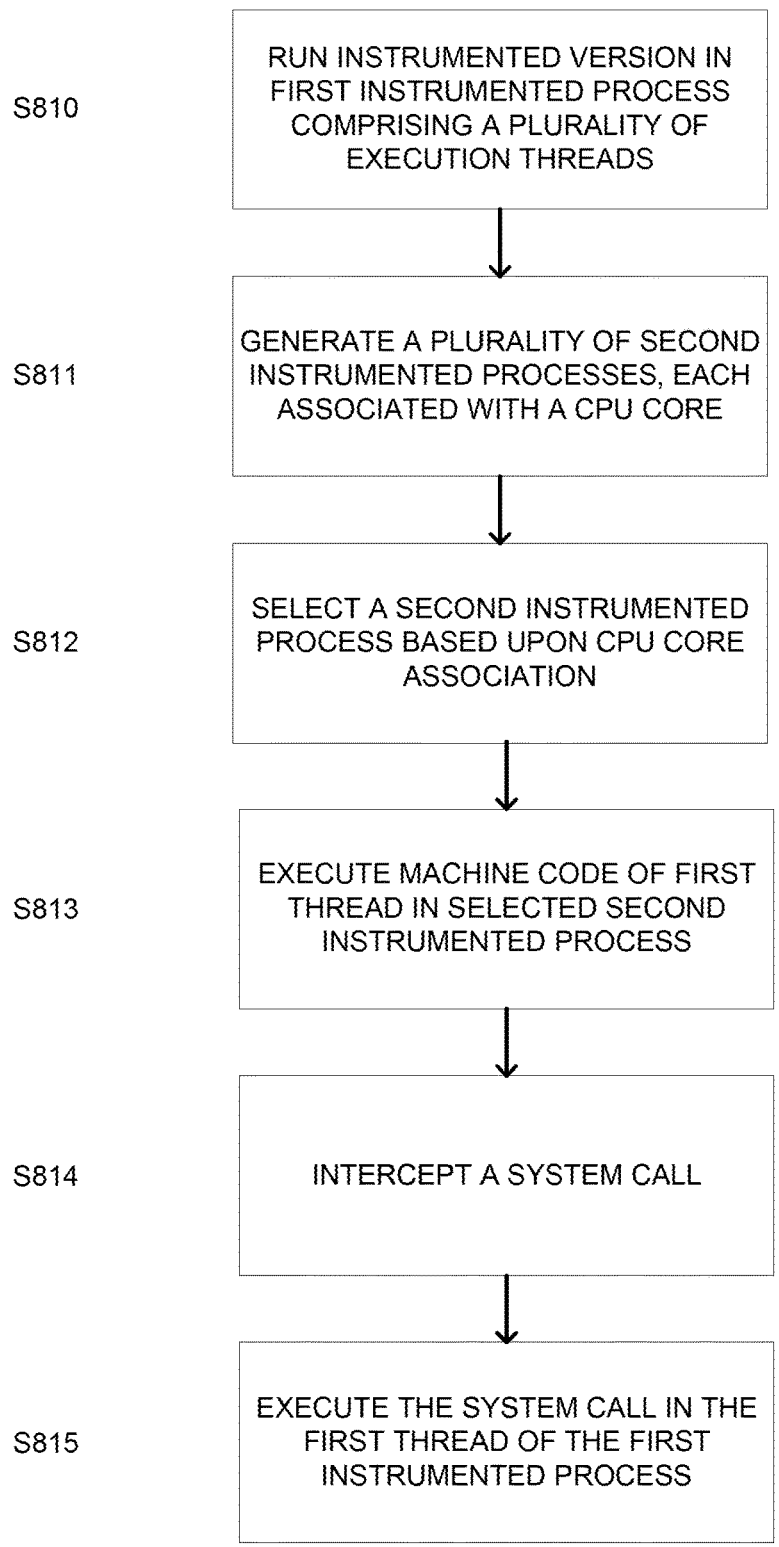

Referring now to FIG. 8B, processing for executing a system call performed by the system of FIG. 7B is described. The processing of FIG. 8B is largely similar to the processing shown in FIG. 8A with reference to the system of FIG. 7A. At step S810, an instrumented version of machine code providing a computer program is executed in a first instrumented process 710. As depicted in FIG. 7B, the first instrumented process 710 comprises a plurality of threads 710a . . . 710n.

At step S811, a plurality of second instrumented processes 715-718 is generated. As described above, each of the second instrumented processes is associated with a CPU core 711-714. A second instrumented process is selected at step S812 based upon the CPU core association as described above. The machine code of a first thread of the first instrumented process 710 is executed in the selected second instrumented process at step S813.

The machine code executed in the selected second instrumented process includes one or more system calls. At step S814, a system call made during the execution of machine code in the selected second instrumented process is intercepted and, at step S815, the system call is executed by the first thread in the first instrumented process 710.

Figure 11:
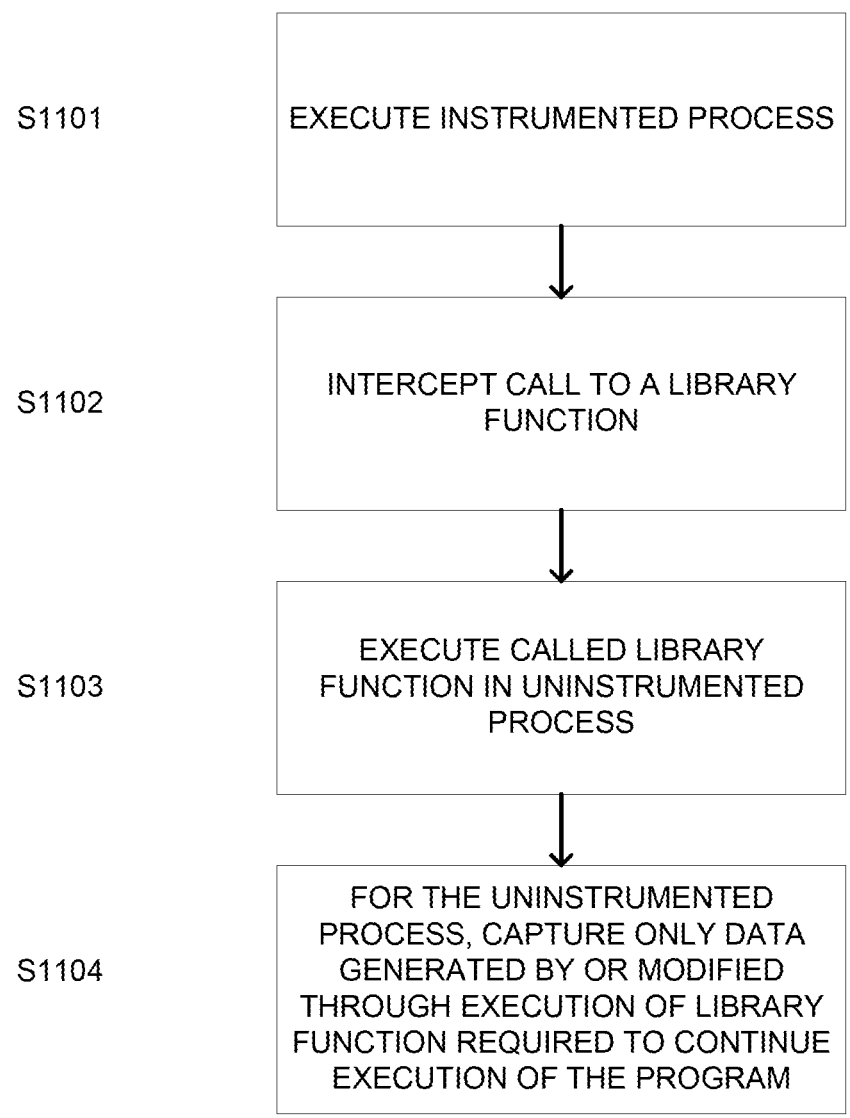
FIG. 11 is a flowchart showing processing carried out for executing a library function call in an uninstrumented process.

The considerations discussed above with reference to the processing of FIG. 8 in relation to providing data resulting from the execution of the system call and data synchronisation may also equally apply to the processing of the FIG. 11. In addition, the exemplary implementation discussed above with reference to FIG. 9 may also equally apply.

Where a system call creates a new thread, such as fork( ) or clone( ), as the system call is executed by the first thread within the first instrumented process, the newly created thread will belong to the first instrumented process and be part of the plurality of execution threads of the first instrumented process. This newly created thread may also be the basis for a further instrumented process.

Each process has its own independent address space and as such, memory mapping system calls may require further consideration. For example, a mmap( ) system call to map files or devices into memory will initially result in memory being allocated in the first instrumented process executing the system call. Upon resumption of execution by the second instrumented process, the second instrumented process may attempt to access such memory. However, using the memory fault techniques described above, such an access can be detected and the memory of the second instrumented process may be populated as necessary.

Another example is the munmap( ) system call which unmaps the memory allocated by mmap( ). In this case, the ownership of the memory should be removed before unmapping and any further attempts to access the unmapped memory will result in a memory fault as expected.

In the case of mremap( ) which expands or shrinks an existing memory mapping, the same behaviour described above with reference to mmap( ) and munmap( ) can be applied depending on whether further a memory allocation is required or a reduction is desired.

For the mprotect( ) system call which specifies the protection level for memory, ownership of affected pages should be removed.

Another consideration is that of both synchronous and asynchronous signals. Synchronous signals may be generated during execution of code in the second instrumented process. For example, a "SIGSEGV" signal may be generated when the process performs a segmentation violation such as an attempt to access an invalid memory location. Synchronous signals should be reported to an instrumented signal handler function running within the second instrumented process as if the synchronous signal had originated from the first thread within the first instrumented process.

Asynchronous signals may be raised against the first thread within the first instrumented process and should be relayed and applied to the second instrumented process. Two examples of asynchronous signals are a "SIGINT" signal which is sent to a process when a user wishes to interrupt the process and a "SIGHUP" signal which is sent to notify a process that its controlling terminal has been closed.

ii. MMU-based single-process: It is possible to effectively give each thread within a process its own address space by offsetting each thread's memory access by some fixed amount, where each thread is assigned a unique offset such that the adding of any valid address to the offset does not yield another valid address.

This could be achieved by translating code differently for each thread, applying the relevant constant offset to all memory accesses.

The main disadvantage with such an approach is that it will put considerable pressure on the virtual address space. This is unlikely to be a problem in practice for programs with a 64-bit virtual address spaces, but may be prohibitive for 32-bit address spaces.

iii. MMU-less: Alternatively one can avoid use of the MMU, and keep a "meta-data" that gives a thread owner for each address, and every access would do a software check of ownership. This would impose overheads for single-threaded accesses to memory, although accesses to unused memory and some accesses to multithreaded memory would be cheaper (because in such cases there would be no memory protection faults).

Post-Hoc Analysis of Program Execution

We now describe methods and systems for analysing the operation of a computer program according to some preferred embodiments of the invention. These preferably, but not essentially, employ a backwards debugging system as previously described: to allow deterministic replay of machine code; to perform a reverse search to find a most recent time when a condition held; and to facilitate single or multiple deterministic execution replays with instrumentation code (which may be the same or different for different executions), to facilitate debugging analysis.

Thus broadly speaking we will describe a method for using customised instrumentation and a recording of a computer program's execution to perform arbitrary analysis of the execution, where the choice of how to analyse a program's execution does not have to be made before the reference execution: Instead embodiments of the system are able to analyse the (exact) same execution in multiple different ways. In particular, by using the concept of a 'reverse search', it becomes possible to analyse program execution in ways that were previously impractical.

Typically a recording of a program's execution comprises a starting state, and a log of non-deterministic events that happened during execution. Non-deterministic events have been described above and include the effects on registers and the process's memory of system calls, reads from shared memory, non-deterministic CPU instructions, delivery of asynchronous signals and the like.

One method of creating such a recording is to instrument the binary code of the program, so that during the reference execution the system can get control when a non-deterministic event happens and record the exact time and effects of the event, so that the event can be stored for use later to faithfully replay execution. When replaying such a recording, the system uses instrumentation in a similar way, so that control is acquired at the exact point in execution at which each event needs to be replayed. A recording of the execution may be kept in memory, or stored in a file to allow multiple instances of replay.

Preferred embodiments of the invention concern the use of customised instrumentation when replaying. By embellishing the instrumentation with extra functionality, it is possible to log and analyse the execution of the original program in arbitrarily complicated ways. Furthermore, working with a recording means that a user does not have to decide in advance what to analyse—instead a user is able to decide after the system has recorded the execution, and to employ custom instrumentation when replaying execution in order to find out about different aspects of the execution.

This gives great flexibility—for example an analysis of memory usage may lead to a desire to look at where a particular value came from (for example a large value passed to malloc( )). Without access to a recording and custom instrumentation, this would be slow and inconvenient and would often not give consistent information (if the program does not behave exactly the same way each time it is run).

Example: Generating Function Call Graphs

It can be useful to establish details about which functions call other functions, for example to generate a call-graph. While this is possible to do by inserting special code at compile, link, or run time, this requires special actions before execution.

If the system has a recording of a program's execution then it is possible to add extra functionality to the replay instrumentation that tracks all 'call' instructions, storing the caller's address and the callee's address.

For example, whenever a 'call' instruction is instrumented, typically it is translated into code that ensures that the code at callee's address has been instrumented, and jumps to the instrumented address instead of the non-instrumented address. The system can customise the instrumentation to insert extra code at this point to first jump to instrumentation code operating with a dedicated internal stack that writes information relating to the call to a file or an in-memory buffer, for example raw address data of the caller and/or callee.

Replaying the execution of the program with this special instrumentation can then generate (preferably complete) information about all function calls, and the system can then separately use symbol information to translate the raw addresses to function names.

In embodiments this instrumentation code (and the instrumentation code described hereafter) collects information relating to the program flow without changing the "visible" effect of the program. Thus in embodiments it comprises code and data which is separate to but interweaved with the instrumented program, and has its own private memory (including a stack).

Example: Getting a Log of Heap Usage

Getting information about heap usage usually requires that some special code is inserted at compile, link or run time, to track calls to heap functions such as malloc( ), realloc( ) and free( ).

If the system has a recording of a program's execution, then it is possible to add extra functionality to the replay instrumentation so that the malloc( ), realloc( ) and free( ) functions log their parameters and return values.

This can be done by modifying the "instrumentation engine" (the interweaved instrumentation code described above) to know about, more particularly identify, the addresses of the functions of interest, and instrument these functions differently from normal, for example to log the parameters to a file or in-memory buffer, run the (instrumented) function, log the return value, and then return to the (instrumented) caller.

Replaying the execution of the program with this instrumentation can then generate complete information about heap usage—for example (preferably all) attempts to allocate, reallocate and free memory, and the success/failure of these calls.

Example: Using 'Register Watchpoints' to Give Reverse Data-Flow Analysis

Instrumentation code can track the flow of data through the execution of the program's execution by logging changes to particular registers.

A particularly useful way of analysing dataflow is to answer the question 'where did this value come from?'. When the value in question is in memory, the system can use hardware watchpoints (typically provided by the CPU), together with reverse execution to go back to the most recent time that the value was modified. However if a value is in a CPU register, there is no equivalent mechanism provided by CPU hardware.

If the system has control over the instrumentation of execution replay however, the system can re-instrument the replay of execution in such a way as to detect all writes to one or more registers, using a technique we refer to as 'register watchpoints'. In embodiments this involves analysing each CPU instruction to see what registers it reads and/or writes. For each basic block (a sequence of instructions ending in a branch), the system generates a bitfield where bit N is set if any instruction in that basic block writes register N.

The system can then implement a search algorithm to detect the most recent write to any of a set of registers as follows:

It is presumed that the system has a starting snapshot at time t0, and preferably some other snapshots that were created at intervals when replaying previously, at times t1, t2, t3, . . . (As previously described, once a log of non-deterministic events is available snapshots may be created after-the-event by replaying the "reference execution").

It is presumed that the system also has a current snapshot at tn.

Go back to tn−1, and run forward until tn, but for each basic block update a global 'time' (instruction count) value with the current time if that basic block's register-write bitfield has any of the specified register bits set.

If the system detected a basic block that writes to the specified registers, rewind back to the 'time', then analyse the instructions in the basic block individually to find the latest instruction that modifies any of the specified registers, and step forward to this latest instruction.

Otherwise, go back to tn−2 and run forward to tn−1, and repeat.

Eventually, this procedure will have found the most recent time at which any of the specified registers were written to. Thus the system can effectively use reverse-execution to track data flow.

Instructions that write to a register may obtain the written value from different places:
1. Load from memory.
2. Calculate a value from another source register, e.g. a 'move' instruction.
3. Calculate a value from more than one other source register, e.g. an 'add' instruction.

Often a user will want to continue to follow the data further back in execution time.

In case 1, the system can follow the data further back in time by setting a hardware (for example CPU) watchpoint and doing a reverse-continue (that is, continuing the reverse search). Alternatively, for example in the case that hardware watchpoints are not available, the instrumentation code could be used to identify instructions that write to a given location in memory.

In case 2, the system can perform another reverse search with a register watchpoint on the source register.

In case 3, there are multiple sources of the data, leading to bifurcation. In this case, the system can offer the user a choice of which source to follow, or spawn separate jobs to automatically follow all paths. In some cases the multiple paths may 'rejoin' further back in time. In preferred implementations the separate jobs use a shared log to detect if they converge on the same path. This can be done by noting that a search is uniquely identified by its starting time and the register or memory watchpoints that are being used.

The above approach can be contrasted with an approach that does not employ reverse execution. Without reverse execution there is a combinatorial explosion—all register and memory changes have to be tracked as there is a possibility that one of them may be involved in the ultimate dataflow of interest. In contrast, using the reverse-search technique described above allows the procedure to limit the search to just the registers or memory that are determined to be important at each particular stage.

Example: Using 'Register Watchpoints' to Give Forwards Data-Flow Analysis

A modified version of the reverse data-flow analysis described above can be used to track forwards data-flow. As before, if data is in memory a hardware (CPU) watchpoint or instrumentation can be used. However if data is in a register the system operates to run forwards to the next time at which that data is read. This can be done as previously described except that with forwards data-flow analysis the system uses the instrumentation to detect when registers are being read as well as when they are being written. It is still possible to get bifurcation, but this time it happens when the same register is read multiple times without being written to.

Thus a procedure implemented by embodiments of the system is as follows:

Instrument to detect when a particular register is read or written.

Run forwards from the current position, stopping whenever a target register is read or written, or when the end of execution is reached.

If the end of execution is reached, the procedure ends.

If a target register is written, the procedure also ends—the original data that was being tracked has been destroyed.

Otherwise the system has reached an instruction that reads a target register. The system may then stop (immediately), but there is more information which may be gathered—for example the target register could still be used later. Preferably therefore the system adds information about the current execution time to a data structure (list), and continues.

After the search has terminated the system can look at each item in the list. Each item will be an instruction that reads from a target register and modifies other registers and/or memory. The system can then use hardware (CPU) watchpoints and/or further register watchpoints to track the data-flow further forward in time.

Opaque Libraries

It is often desirable for programs to make use of existing code in shared libraries. Such code re-use has the advantage of speeding up program development as programmers do not need to write all program code from scratch and it is generally assumed that code in a library has been tested and is correct. In addition, libraries may provide access to functionality of additional hardware such as graphics cards or other devices.

When a program or process being debugged makes use of libraries, the execution of library code will be recorded in accordance with the techniques described above. However, recording the execution of library code may not be necessary or desirable from the point of view of the user of the debugger. For example, a user may only be interested in debugging code written by the user or his associates. As mentioned above, it is normally assumed that library code is correct or else that it is not the responsibility of the user to debug library code. Therefore, any unnecessary recording of the execution of library code may result in slowdown and unnecessary usage of resources.

Further impacting on performance is that library code may make use of undocumented system calls or input/output control calls. Given the undocumented nature of these calls, it may not be possible to analyse the call and optimise recording of its execution for deterministic replay which can incur further expense.

In addition, library code may perform actions that are not supported by the debugger, hindering the debugger's ability to record execution of the process and to provide deterministic replay of the process. A method is therefore required to improve performance when handling library code whilst also ensuring that a process can be replayed deterministically.

To achieve this, a call to a library function in the instrumented process may be intercepted. The call may then be executed by a second uninstrumented process. The memory interactions between the instrumented process and the uninstrumented process caused by executing the library function call may be captured in the event log using the techniques previously described above.

The method is based upon the observation that in order to ensure deterministic replay of a process that calls a function in a library, only the effect on the process as a result of calling the library function must be recorded. As such, it is not necessary to record the internal execution of the library function if this is not desired by the user as long as the library function's effects on the process are recorded.

In this way, the library function call is still executed as required, from the point of view of the instrumented process. However, the execution of the library function is not recorded, thereby improving performance. Only the effect of the library function call is recorded and thus allows for deterministic replay by replaying the recorded effect of the library function call.

Figure 10:
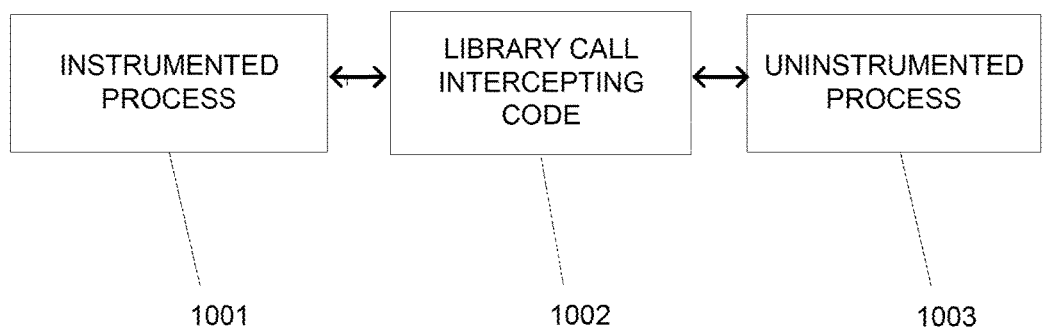
FIG. 10 is a schematic illustration of a system for executing a library function call in an uninstrumented process.

Referring now to FIG. 10, an instrumented process 1001 is arranged to execute a computer program to define a reference execution in accordance with the techniques described above. The instrumented process 1001 is in communication with library call intercepting code 1002 which is arranged to intercept calls to library functions made by the instrumented process 1001 during the execution of the computer program. An uninstrumented process 1003 in communication with the library call intercepting code 1002 is arranged to execute the intercepted library function calls.

The library call intercepting code 1002 may be responsible for ensuring that the uninstrumented process 1003 has available to it the data required for the correct execution of the library function. The library call intercepting code 1002 may also be responsible for copying any expected output data as a result of the execution of the library function to the memory of the instrumented process 1001 and for any required synchronisation of the data held in the memory of the instrumented and uninstrumented processes to ensure correct behaviour of the instrumented process and the library function. These memory interactions, in particular those that have an effect on the instrumented process and are required for deterministic replay, are captured and recorded in a log in accordance with the techniques described above.

Referring now to FIG. 11 in which processing performed by the components in FIG. 10 is shown, at step S1101, the computer program is executed in the instrumented process 1001 to define a reference execution of the program. During execution of the computer program in the instrumented process, a call to a library function is made. At step S1102, the call to the library function is intercepted by the library call intercepting code 1002. The library function is then executed by the uninstrumented process 1003 at step S1103.

Data that is generated by or modified through the execution of the library function by the uninstrumented process is captured in a log at step S1104. However, only the data that is required by the instrumented process to continue execution of the program is captured at step S1104. The log itself is arranged to enable deterministically reproducing the effect of the library function call on the instrumented process upon re-running of the reference execution based upon the log. This may be performed using techniques similar to that described above in relation to the log of non-deterministic events. The log for non-deterministic events may comprise this library execution log.

For the instrumented process, any non-deterministic events are captured in the log in a similar manner to that described above to enable deterministic replay of the reference execution based upon the captured log.

The captured data at step S1104 may comprise at least one memory interaction between the instrumented process and the uninstrumented process caused by the execution of the library function call. However, only the memory interactions that have an effect on the execution of the computer program in the instrumented process and affect the deterministic replay of the library function call should be captured in the log. The memory interactions that have an effect on the execution in the instrumented process may be determined through an analysis of the memory usage of the library function and the library's application programming interface which is described in more detail below.

Prior to the execution of the library function call at step S1104, the library call intercepting code may ensure that any inputs required to execute the library function are made available to the uninstrumented process. In addition, the library call intercepting code may instruct the update or synchronisation of any data held in memory locations that are processed during the execution of the library function call.

After execution of the library function call at step S1104, any output data may be returned to or intercepted by the library call intercepting code. The output data may be returned to the instrumented process by the library call intercepting code. The occurrence of a library function call, the input data, any output data and any other effects visible to the instrumented process may then be recorded in the event log.

The uninstrumented process may be created based upon the instrumented process.

For example, the uninstrumented process may be created using the well-known "double fork" technique such that the uninstrumented process is not a child process of the instrumented process. The uninstrumented process may be created in response to loading or attaching of the library to the instrumented process. Alternatively, if an uninstrumented process has previously been created, a new process may not need to be created and the existing uninstrumented process may continue to be used.

Intercepting a call to a library function at step S1102 may also comprise determining which library function has been called. The library function being called may be determined based upon a memory location of the instruction that is to be executed. Upon loading or attaching of the library, a list of exported symbols indicating the functions of the library that are called by the process may be extracted. The memory locations at which each library function has been loaded into memory may be resolved either prior to extraction or after extraction of the exported symbols.

When the instrumented process attempts to branch to a particular memory location, the memory location may be compared with the resolved memory locations for the library function code and the library function being called may therefore be determined.

The library call intercepting code may cause the uninstrumented process to execute the intercepted library function by means of a remote procedure call. The library call intercepting code may determine and marshall the required input parameters of the library function being called. The input parameters required by the library function may have been determined through a prior analysis of the application programming interface of the library. The actual memory locations of the required input parameters may be determined by reading the appropriate stack or register values based upon the application binary interface associated with the current CPU and operating system. The input parameters and any input buffers may be copied to an area of shared memory that is also accessible by the uninstrumented process. The uninstrumented process may access this data in the shared memory when the library function is to be executed.

Any output data generated by execution of the library function may be returned to the instrumented process from the uninstrumented process. This may occur via the library call intercepting code. For example, the output data may be copied to the area of shared memory from which the input data was copied to.

The remote procedure call may use a mutual exclusion mechanism such as semaphores, similar to that described above and in FIG. 9 to ensure that the operations of the instrumented process, library call intercepting code and uninstrumented process are performed in the correct order.

In contrast to known remote procedure call frameworks where a distributed object brokering system is used, for example, CORBA, Distributed COM and Java Remote Method Invocation, the method described above does not rely upon managed objects. Instead, the remote procedure call is implemented in a runtime environment with references to memory locations (pointers). This is enabled through instrumentation, however, a full definition of the library's application programming interface may also be necessary as described later.

In addition, usage of the described method does not require any modification of library code or the library's application programming interface. The library code is not "aware" and does not need to be aware that it is being executed by another process via for example, a remote procedure call. As such, any library that meets the supporting requirements (described below) may be used in conjunction with the described method.

For a library function to be supported, its impact on the calling process may be analysed. For example, any side-effects that affect deterministic replay must be captured and recorded. Any internal memory used by the library function that has no outside impact may, however, be ignored.

In addition, the memory usage of the library function may be analysed such that any data expected by the library function is provided in the correct manner for the library function to execute correctly. On the other hand, it is preferable that memory not be held for longer than necessary to reduce memory requirements. As such, an analysis of the lifetime of allocated memory and the synchronisation of data between a calling process and library-execution process may be performed to determine how memory should be handled. The library's application programming interface may be one exemplary source of information for such an analysis.

An analysis may, for example, be performed based upon pointer usage, including any pointer arguments and any pointers embedded in structures passed by reference. In either case, pointers associated with both input arguments and output arguments may be considered.

Under an exemplary analysis, pointer usage may be classified into and handled according to one of the following four categories:

1. Caller-specified, transient, read-only: the memory referred to by the pointer is initially under the control of the instrumented calling process. The data held in the memory referred to by the pointer is copied to a temporary location in the memory of the uninstrumented library-executing process. This temporary data is used in the execution of the library function and is discarded at the end of the library function call. For example, the instrumented calling process may pass input data via any suitable data structure, such as a "struct" in the C/C++ programming languages. The library function may use the data in its execution, however retaining the data after usage is not required and therefore the data may be discarded. The library function does not modify the data. Another example may be that of a previously returned pointer from the library function for use as a handle by the instrumented calling process, the purpose of which is to enable the instrumented calling process to refer to private data held by the library for future library function calls.

2. Caller-specified, transient, read-write: the memory referred to by the pointer is initially under the control of the instrumented calling process. The data held in the memory referred to by the pointer is copied to a temporary location in the memory of the uninstrumented library-executing process. The execution of the library function may or may not modify the data in the temporary location. In any case, the data is copied back to the memory location referred to by the pointer in the instrumented calling process at the end of the execution of the library function. The temporary data is discarded after copying back. For example, the library function may output data via a structure and the instrumented calling process may be responsible for allocating memory for the data structure.

3. Caller-specified, persistent: the memory referred to by the pointer is initially under the control of the instrumented calling process. Upon the first call to the library function, the data held in the memory referred to by the pointer is copied to a location in the memory of the uninstrumented library-executing process. The execution of the library function may or may not modify the data in the memory of the uninstrumented library-executing process. Regardless, the data is copied back to the memory referred to by the pointer in the instrumented calling process. The memory of the instrumented calling process and uninstrumented library-executing process is synchronised on entry and exit of every subsequent call to the library function. For example, this category applies to any library where it is not possible to determine when memory is no longer usable by the library.

4. Library-allocated, discard-on-event: the memory referred to by the pointer has been allocated by the uninstrumented library-executing process. At the end of the execution of the library function, the data held in the memory referred to by the pointer is copied to the memory of the instrumented calling process and synchronised on every call to the library function until an event occurs such as the memory is defined to be invalid. This may be implemented as a pointer returned to the calling instrumented process that refers to a special area of memory of the library call intercepting code instead of within the instrumented calling process's heap. For example, in a graphics processing library, a library function may return a pointer to a frame buffer into which the calling instrumented process may write to directly. The pointer may point to a memory-mapped hardware frame buffer.

An incorrect analysis of memory usage may result in decreased performance. For example, if memory is made too persistent, many unnecessary copies may be made. However, if memory is discarded too early, this may result in incorrect behaviour (although, this may be detected through a suitable memory protection mechanism at some performance cost.)

As will be appreciated, a pointer refers to a particular location in memory. The data that requires synchronisation may begin from the location indicated by the pointer. The length of the data and the memory that requires synchronisation may be determined through various methods known to the person skilled in the art. For example, the type of the pointer may indicate the size of the data and length of memory, e.g. an "int" pointer indicates a location in memory that stores an integer value which is normally 32 bits in length. The length of memory may also be provided by another argument, for example, it is common practice to pass a buffer pointer together with a length value. Alternatively, the length of memory may be implied in some other way as would be known to the person skilled in the art.

Furthermore, where the memory to be synchronised also includes further pointers to other locations of memory, these other locations of memory also require synchronisation. As such, the synchronisation operation may be recursive. Determining whether the memory to be synchronised includes further pointers may require knowledge of the structure and the layout of memory which may be defined in the library's application programming interface. Where a library's application programming interface is well documented, it may be possible to extract such information automatically.

In some cases, it may be necessary to provide "live" synchronisation of persistent memory areas between the instrumented calling process and the uninstrumented library-execution process. For instance, in the frame buffer example above, the instrumented calling process may expect that any writes to the instrumented calling process's version of the frame buffer will be rendered on screen instantly. In another example, the instrumented calling process may need to poll a memory location that the instrumented calling process expects the library function to update. Live synchronisation may be implemented by, for example, generating a memory fault on access to the memory location or by using a hidden synchronisation thread.

If the library function requires memory to be shared between the instrumented calling process and the library, this may be handled with the shared memory techniques described above, for example, by generating a memory fault on any access to the shared memory and synchronising with the data in either process.

In some arrangements, it may be preferable that the memory layout of the instrumented calling process be "mirrored" in the uninstrumented library-execution process. That is, when blocks of data are copied to the uninstrumented library-execution process, it may be desirable that those blocks of data have the same memory location in the uninstrumented library-execution process as in the instrumented calling process. Using mirroring avoids the need to modify pointers to refer to a different memory location if the memory layout between the two processes is not the same. However, replicating the memory layout may use more memory. For example, a linked list may span multiple pages of memory, potentially requiring many memory mapping system calls to allocate. In extreme circumstances, there may not be enough memory available to mirror the memory layout.

The analysis of the memory interactions between the instrumented calling process and the uninstrumented library-executing process may be received prior to the execution of the computer program. For example, the library call intercepting code may be programmed based upon the analysis of memory interactions. Capturing the memory interactions between the instrumented process and the uninstrumented process caused by the execution of the library function call may then be based upon the received analysis, allowing for optimisation of the execution and capturing.

Another consideration is that of signal handling. Execution of the library function may cause a signal to be raised, for example, if an attempt is made to access unmapped areas of memory. For asynchronous signals, this may be handled by installing default signal handlers in the uninstrumented process when the uninstrumented process is started. If an asynchronous signal is raised during execution of the library function, the signal handler records the fact that the signal occurred and passes the information to the instrumented process upon completion of the library function call. The instrumented process then raises the signal as if it had originally been sent to the instrumented process. For synchronous signals, these will not normally be handled given that they usually indicate a logic error in the library code.

Where a library installs its own signal handlers, the effect of the signal handler will be limited to the library code itself whereas the effect of a signal handler is normally application wide.

If a library function starts its own threads, the library may be used in conjunction with the described method given that a thread will only be accessing parent process's memory. In the arrangement described above, the parent process would be the uninstrumented process 1003. As such, the above memory considerations are not affected by a multi-threaded library process.

Figure 12:
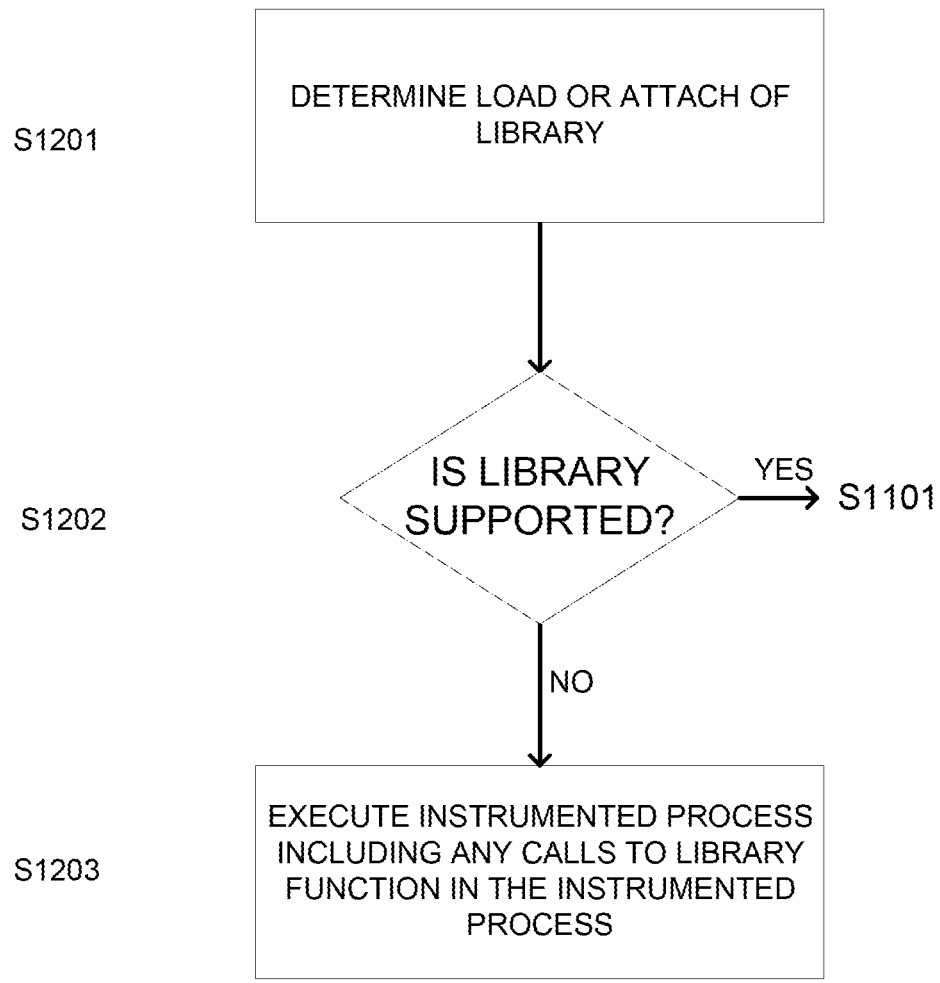
FIG. 12 is a flowchart showing processing to determine if the processing of FIG. 11 is to be carried out.

If a library is not supported, the library function is executed by the instrumented process. The execution of the library function will be recorded as per the techniques described previously in relation to code executed by the instrumented process. Referring to FIG. 12, at steps S1201 and S1202, a run-time check may be performed to determine if a loaded or attached library is supported. If the library is supported and can be executed by the uninstrumented process, processing proceeds to step S1101 and its effects on the instrumented process captured for deterministic replay in the manner described above. Otherwise, if the library is not supported, at step S1203, any library function calls are executed by the instrumented process.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of executing a system call in a multi-threaded computer program for generating program analysis data, the method comprising:
   running an instrumented version of machine code representing the program wherein the instrumented version of machine code initializes a plurality of threads in a first instrumented process;
   generating a second instrumented process;
   executing the machine code of a first thread of the first instrumented process in the second instrumented process;
   intercepting a system call during the execution of the machine code of the first thread in the second instrumented process; and
   executing the system call in the first instrumented process.

2. A method according to claim 1,
   wherein generating the second instrumented process comprises generating a plurality of second instrumented processes, each one of the plurality of second instrumented processes being associated with a respective central processing unit (CPU) core;
   wherein the first thread of the first instrumented process is associated with a CPU core;
   the method further comprising:
   selecting the second instrumented process of the plurality of second instrumented processes based upon a corresponding CPU core association between the selected second instrumented process and the first thread of the first instrumented process; and
   wherein executing the machine code of the first instrumented process in the second instrumented process comprises executing the machine code in the selected second instrumented process.

3. A method according to claim 2, wherein a second instrumented process is associated with a CPU core by binding the second instrumented process to the CPU core.

4. A method according to claim 2, wherein the association between the first thread of the first instrumented process and a CPU core is based upon the CPU core that the first thread is currently running on or was most recently run on.

5. A method according to claim 2, further comprising:
   executing a second thread of the first instrumented process in the second instrumented process whilst executing the system call in the first instrumented process;
   wherein the second thread is associated with the CPU core that the second instrumented process is associated with.

6. A method according to claim 2,
   wherein the number of second instrumented processes generated is based upon a CPU core count.

7. A method according to claim 1, wherein the second instrumented process is generated based upon the first thread of the plurality of threads in the first instrumented process.

8. A method according to claim 1, further comprising:
   providing data resulting from the execution of the system call in the first instrumented process from the first instrumented process to the second instrumented process that was executing the machine code of the first thread.

9. A method according to claim 1, wherein executing the system call in the first instrumented process is caused by a remote procedure call.

10. A method according to claim 1, wherein intercepting the system call comprises:
    marshalling input data and input buffers into the area of memory shared between the first instrumented process and the second instrumented process; and
    notifying the first instrumented process to execute the system call.

11. A non-transitory computer readable medium comprising processor readable instructions configured to cause one or more processors to carry out a method comprising:
    running an instrumented version of machine code representing the program wherein the instrumented version of machine code initializes a plurality of threads in a first instrumented process;
    generating a second instrumented process;
    executing the machine code of a first thread of the first instrumented process in the second instrumented process;
    intercepting a system call during the execution of the machine code of the first thread in the second instrumented process; and
    executing the system call in the first instrumented process.

* * * * *